(12) United States Patent
Jarisch et al.

(10) Patent No.: US 11,834,254 B2
(45) Date of Patent: Dec. 5, 2023

(54) MULTI-SERVING PRODUCT DISPENSER SYSTEM

(71) Applicant: SOCIETE DES PRODUITS NESTLE S.A., Vevey (CH)

(72) Inventors: Christian Jarisch, Lutry (CH); Nicolas Camier, Brignais (FR)

(73) Assignee: Societe des Produits Nestle S.A., Vevey (CH)

( * ) Notice: Subject to any disclaimer, the term of this patent is extended or adjusted under 35 U.S.C. 154(b) by 95 days.

(21) Appl. No.: 17/427,714

(22) PCT Filed: Feb. 12, 2020

(86) PCT No.: PCT/EP2020/053663
§ 371 (c)(1),
(2) Date: Aug. 2, 2021

(87) PCT Pub. No.: WO2020/165291
PCT Pub. Date: Aug. 20, 2020

(65) Prior Publication Data
US 2022/0127062 A1    Apr. 28, 2022

(30) Foreign Application Priority Data
Feb. 13, 2019    (EP) .................................... 19156921

(51) Int. Cl.
*B65D 83/54*    (2006.01)
*A47J 47/01*    (2006.01)
(Continued)

(52) U.S. Cl.
CPC ............. *B65D 83/54* (2013.01); *A47J 47/01* (2013.01); *A47J 47/06* (2013.01); *G01F 11/029* (2013.01); *A47J 31/404* (2013.01)

(58) Field of Classification Search
CPC . B65D 83/54; A47J 47/01; A47J 47/06; A47J 31/404; G01F 11/029
See application file for complete search history.

(56) References Cited

U.S. PATENT DOCUMENTS 2,062,109 A * 11/1936 Rogers ...................... A23F 5/04
                                                                 241/12
4,187,992 A *  2/1980 Del Valle ................ A47J 42/06
                                                                 241/101.8

(Continued)

FOREIGN PATENT DOCUMENTS

CN        1882273 A       12/2006
CN       101336805 A       1/2009

(Continued)

OTHER PUBLICATIONS

Chinese Office Action for Chinese Appl No. 202080012713.3 dated Feb. 10, 2023.

(Continued)

*Primary Examiner* — Jeremy Carroll
(74) *Attorney, Agent, or Firm* — K&L Gates LLP

(57) ABSTRACT

The invention relates to a product container (1) for multiple dosing of a food product, comprising an inner volume (3) with a food product, this inner volume (3) being pressurized with nitrogen gas; the product container (1) further comprising a rotatable outlet element (7, 30) able to move from a position where the outlet of the container is open to a position where the outlet of the container is closed, being able to open and close the volume of the container under pressure; the pressure inside the container being higher than the atmospheric pressure. The invention further relates to a multi-serving product dispenser system for multiple dosing of a food product, comprising a product container (1) according as disclosed and a dosing mechanism (50), the container (1) being connectable to the dosing mechanism (Continued)

(50) by means of the rotatable outlet element (7, 30) in a tight manner, the dosing mechanism (50) comprising a moveable element (23) which movement is sequential with that of the rotatable outlet element (7, 30) such that the product can be stored, and can be dispensed into a dosing chamber (70) in the dosing mechanism (50), keeping the inner volume (3) of the container at a pressure higher than the atmospheric pressure. The invention also relates to a method for dispensing a food product one or a plurality of times using a multi-serving dispenser system as described.

18 Claims, 25 Drawing Sheets

(51) Int. Cl.
*A47J 47/06* (2006.01)
*G01F 11/02* (2006.01)
*A47J 31/40* (2006.01)

(56) References Cited

U.S. PATENT DOCUMENTS

| | | | | |
|---|---|---|---|---|
| 5,542,583 | A | * | 8/1996 | Boyer .................... G01F 11/46 |
| | | | | 222/445 |
| 2011/0185908 | A1 | | 8/2011 | Berto |
| 2022/0192416 | A1 | * | 6/2022 | Ait Bouziad .......... A47J 31/44 |

FOREIGN PATENT DOCUMENTS

| | | |
|---|---|---|
| CN | 102026568 A | 4/2011 |
| CN | 103519690 A | 1/2014 |
| CN | 205083280 U | 3/2016 |
| CN | 108430229 A | 8/2018 |
| GB | 2175051 | 11/1986 |

OTHER PUBLICATIONS

Chinese Office Action for Chinese Appl No. 202080012713.3 dated Sep. 22, 2023.

* cited by examiner

| Servings of coffee | Each dose 20g | Case 1 Volume (N2) | Pressure | Case 1 Volume (N2) | Pressure |
|---|---|---|---|---|---|
| 1 | 20 | 300 | 3,3333333 | 500 | 2 |
| 2 | 20 | 320 | 3,124999969 | 520 | 1,923076923 |
| 3 | 20 | 340 | 2,941176441 | 540 | 1,851851852 |
| 4 | 20 | 360 | 2,77777775 | 560 | 1,785714286 |
| 5 | 20 | 380 | 2,631578921 | 580 | 1,724137931 |
| 6 | 20 | 400 | 2,499999975 | 600 | 1,666666667 |
| 7 | 20 | 420 | 2,380952357 | 620 | 1,612903226 |
| 8 | 20 | 440 | 2,27272725 | 640 | 1,5625 |
| 9 | 20 | 460 | 2,173913022 | 660 | 1,515151515 |
| 10 | 20 | 480 | 2,083333313 | 680 | 1,470588235 |
| 11 | 20 | 500 | 1,99999998 | 700 | 1,428571429 |
| 12 | 20 | 520 | 1,923076904 | 720 | 1,388888889 |
| 13 | 20 | 540 | 1,851851833 | 740 | 1,351351351 |
| 14 | 20 | 560 | 1,785714268 | 760 | 1,315789474 |
| 15 | 20 | 580 | 1,724137914 | 780 | 1,282051282 |
| 16 | 20 | 600 | 1,66666665 | 800 | 1,25 |
| 17 | 20 | 620 | 1,61290321 | 820 | 1,219512195 |
| 18 | 20 | 640 | 1,562499984 | 840 | 1,19047619 |
| 19 | 20 | 660 | 1,5151515 | 860 | 1,162790698 |
| 20 | 20 | 680 | 1,470588221 | 880 | 1,136363636 |
| 21 | 20 | 700 | 1,428571414 | 900 | 1,111111111 |
| 22 | 20 | 720 | 1,388888875 | 920 | 1,086956522 |
| 23 | 20 | 740 | 1,351351338 | 940 | 1,063829787 |
| 24 | 20 | 760 | 1,315789461 | 960 | 1,041666667 |
| 25 | 20 | 780 | 1,282051269 | 980 | 1,020408163 |
| 26 | 20 | 800 | 1,249999988 | 1000 | 1 |
| 27 | 20 | 820 | 1,219512183 | | |
| 28 | 20 | 840 | 1,190476179 | | |
| 29 | 20 | 860 | 1,162790686 | | |
| 30 | 20 | 880 | 1,136363625 | | |
| 31 | 20 | 900 | 1,1111111 | | |
| 32 | 20 | 920 | 1,086956511 | | |
| 33 | 20 | 940 | 1,063829777 | | |
| 34 | 20 | 960 | 1,041666656 | | |
| 35 | 20 | 980 | 1,020408153 | | |
| 36 | 20 | 1000 | 0,99999999 | | |

FIG. 24

MULTI-SERVING PRODUCT DISPENSER SYSTEM

CROSS REFERENCE TO RELATED APPLICATIONS

The present application is a National Stage of International Application No. PCT/EP2020/053663, filed on Feb. 12, 2020, which claims priority to European Patent Application No. 19156921.9, filed on Feb. 13, 2019, the entire contents of which are being incorporated herein by reference.

FIELD OF THE INVENTION

The present invention is directed to a multi-serving product dispenser system for multiple dosing of a food product, such as coffee powder, a soluble product, tea leaves, coffee beans, or the like. The invention further relates to a tight product container and to a method for dispensing a product from such a container one or a plurality of times.

BACKGROUND OF THE INVENTION

Dispensing systems, particularly those used to dispense certain amounts of coffee, such as coffee beans, typically comprise a container (called coffee bean hopper) where these beans are stored, being then dispensed in one or a plurality of servings of certain quantities. The beans are in contact with air, affecting both the aroma and the organoleptic characteristics of these. The oil in the coffee goes rancid and alters the composition of the volatile constituents of the aroma of coffee.

Besides, the absorption of moisture also promotes the development of microorganisms, particularly when the coffee dispenser is left inactive for long periods. The coffee obtained from these beans is therefore of a much lower quality, freshness and aroma than the one obtained from well-preserved coffee beans. It becomes therefore of primary importance that the beans in the container are kept preserved at optimal storage conditions, both for humidity and oxygen.

Document EP 2848168 A1 in the prior art describes a device for dispensing espresso coffee starting from coffee beans stored in a container which is preserved at vacuum, so a low moisture level is maintained and almost no oxygen is present in the container. In order to guarantee this, the device comprises a vacuum pump so to create vacuum in the container when the pressure inside of it is below a certain level. However, a pump adds complexity to the device, and the device is more costly and bulky, so it is therefore less convenient.

Another document in the prior art is U.S. Pat. No. 5,542,583 A disclosing a system and a method for storing coffee beans in a vacuum environment and dispensing them into an external environment at atmospheric pressure. This system also needs a vacuum pump or pressurizing pump in order to keep the coffee beans at vacuum so they are correctly preserved in a correct atmosphere. The resulting system is therefore complex, costly and bulky.

The aim of the present invention is therefore to provide a multiserving product dispenser allowing product storage at controlled atmosphere without oxidation, also keeping the same controlled atmosphere conditions during the product dosing procedure. The present invention also solves the drawbacks of the prior art providing a dispenser that is more compact, lighter and less complex than that in the known prior art solutions. The system of the present invention prevents or limits the deterioration over time of the characteristics and the aroma of the product stored in it, while also avoids additional costs with respect to prior art solutions.

The present invention aims at overcoming the limitations mentioned in the existing dispensing systems. The invention also aims at other objects and particularly the solution of other problems as will appear in the rest of the present description.

OBJECT AND SUMMARY OF THE INVENTION

According to a first aspect, the invention refers to a product container for multiple dosing of a food product comprising an inner volume with a food product, this inner volume being pressurized with nitrogen gas: the product container comprises a rotatable outlet element able to move from a position where the outlet of the container is open to a position where the outlet of the container is closed, being able to open and close the volume of the container under pressure. According to the invention, the pressure inside the container is higher than the atmospheric pressure.

In the product container according to the invention, the initial headspace typically determines the initial pressure in the container volume. Preferably, the initial headspace and the initial container pressure determine the number of doses allowed by the product container of the invention.

Typically, the initial headspace in the container of the invention is comprised between one-third and one-half of the total volume of the container. Preferably, the initial pressure in the container (1) is comprised between 2 and 3.5 atm.

The product container according to the present invention preferably comprises an oxygen and humidity barrier material preventing oxidation of the food product in its inner volume.

According to a second aspect, the invention relates to a multi-serving product dispenser system for multiple dosing of a food product, the system comprising a product container as the one disclosed and a dosing mechanism: the container is connectable to the dosing mechanism by means of the rotatable outlet element in a tight manner and the dosing mechanism comprises a moveable element which movement is sequential with that of the rotatable outlet element such that the product can be stored, and can be dispensed into a dosing chamber in the dosing mechanism, keeping the inner volume of the container at a pressure higher than the atmospheric pressure.

Preferably, the moveable element in the multi-serving product dispenser system for multiple dosing of a food product according to the invention is a linear piston. According to a different embodiment, the moveable element is a pivotable piston. Yet according to another embodiment, the rotatable outlet element is a rotatable valve, and the container can comprise an inner spring which movement is linked to the movement of the valve.

Typically, in the multi-serving product dispenser system for multiple dosing of a food product according to the invention, the rotatable outlet element is a spherical ball valve, further comprising a mixing blade rotating jointly with the ball valve.

Preferably, the container of the invention is attached to the dosing mechanism either by screwing or by clamping.

Typically, in the multi-serving product dispenser system for multiple dosing of a food product according to the invention, the dosing mechanism further comprises an air channel that can be opened or closed allowing the evacuation of air when in the open position.

Preferably, in the multi-serving product dispenser system of the invention, the dosing mechanism further comprises a secondary air channel to facilitate the emptying of the product from the dosing chamber.

Typically, in the multi-serving product dispenser system for multiple dosing of a food product according to the invention, the dosing mechanism comprises an axis connectable to the rotatable outlet element to move it from a position where the outlet of the container is open to a position where the outlet of the container is closed.

Preferably, the volume in the dosing chamber in the multi-serving product dispenser system of the invention defines the volumetric dose of product to be delivered by the system.

According to a third aspect, the invention further relates to a method for dispensing a food product one or a plurality of times using a multi-serving dispenser system as the one disclosed, the method comprising the steps of:
- connecting a product container in a tight manner to a dosing mechanism, the container being in a first closed position defined by the rotatable outlet element;
- opening the product container by changing the position of the rotatable outlet element;
- dosing a certain quantity of food product by moving the moveable element to create a dosing chamber in the dosing mechanism, keeping the inner volume and the volume of the dosing chamber at a pressure higher than the atmospheric pressure;
- reclosing the product container by changing the position of the rotatable outlet element, while the volume of the dosing chamber remains at a pressure higher than the atmospheric pressure;
- moving the moveable element so the product delivered into the dosing chamber is put at atmospheric pressure and is later delivered.

Preferably, in the method of the invention, when the product into the dosing chamber is put at atmospheric pressure, air enters into this dosing chamber through a second air channel to help delivering of the food product.

Typically, in the method for dispensing a food product one or a plurality of times according to the present invention, at the end of the process, the moveable element goes back to its initial position and air in the dosing chamber is pushed out through an air evacuation tube.

BRIEF DESCRIPTION OF THE DRAWINGS

Further features, advantages and objects of the present invention will become apparent for a skilled person when reading the following detailed description of embodiments of the present invention, when taken in conjunction with the figures of the enclosed drawings.

FIG. 24 shows a table with the values of nitrogen pressure in the headspace volume of a product container according to the present invention, showing how the headpace pressure changes with the dosings made: two exemplary containers are shown, with different initial headspace volumes, different initial nitrogen pressure and therefore allowing different number of dosing.

DETAILED DESCRIPTION OF EXEMPLARY EMBODIMENTS

Figure 1:
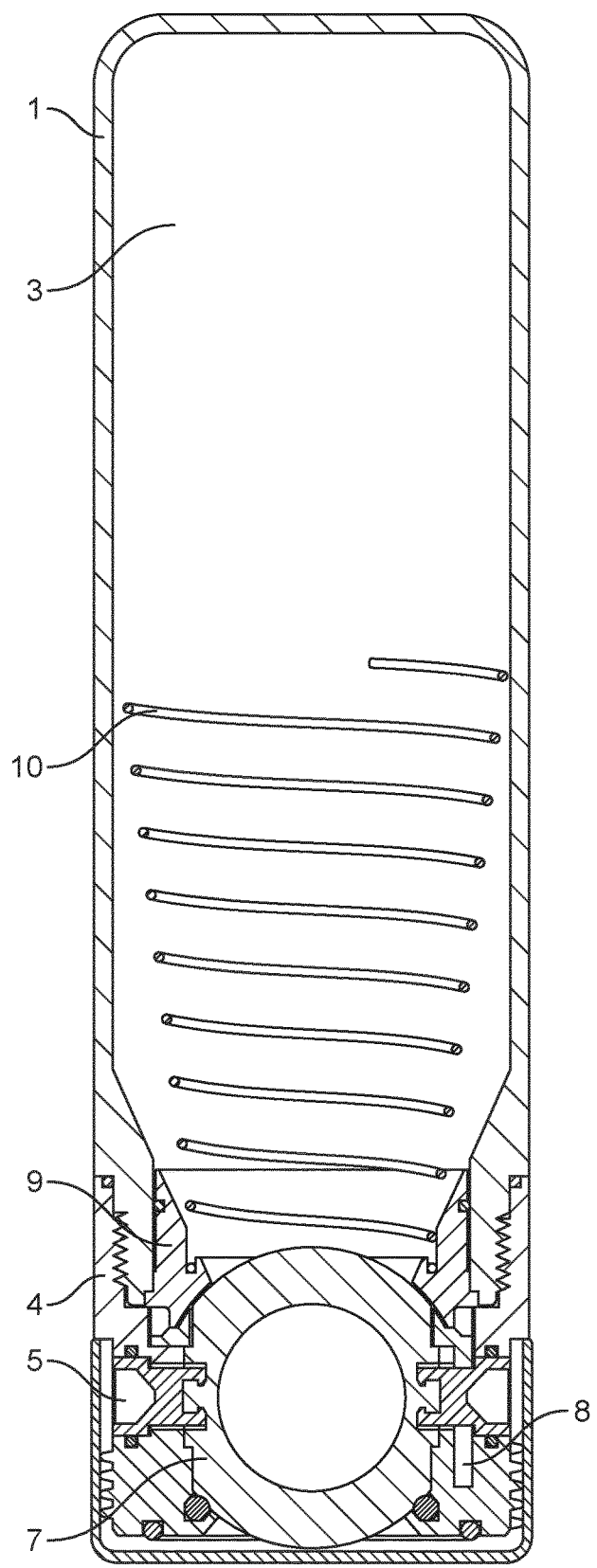
FIG. 1 shows a cut view of the product container according to a first embodiment used in a multi-serving product dispenser system for multiple dosing of a food product according to the present invention.

The invention is directed to a multi-serving product dispenser system for multiple dosing of a food product: the food product can be different, and it can be for example powder coffee, a soluble product, tea leaves, coffee beans, or the like; typically, the food product will be sensitive to oxygen and humidity. The product in the dispenser system of the invention will typically be a food product which is sensitive to oxygen and to humidity, so it has to be preserved in controlled atmosphere conditions. The system of the invention will store the product in the container completely isolated from oxygen at any time, during storage and also during dispensing of the product: therefore, the same freshness as in single portioned products can be guaranteed. Furthermore, packaging waste is strongly reduced with the system of the invention as the containers serve to multiple dispensings and are designed to be refilled in shops or factories. Finally, the same ease of use is guaranteed as for capsule systems, as the user connects the product container to the dosing mechanism as easily as a capsule, as it will be further explained: instead of ejecting the used capsule, the user puts back the container into a storage place, where there are for example multiple containers, each one comprising a different food product. Such a concept allows multiple product containers that can easily be exchanged on the same dosing mechanism, depending on the desired food product. The dosing done by the system of the invention is a volumetric dosing.

The multi-serving product dispenser system of the invention comprises a product container 1 and a dosing mechanism 50, to which the container 1 is connected for the dispensing of the product.

The product container 1 according to the present invention comprises the food product flushed with nitrogen as inert gas, such that the container is maintained pressurized at every time, not only during storage but also during dispensing of the product from it. The container comprises an oxygen and humidity barrier packaging material in order to prevent the food product inside of it to oxidize or cake. The aim of the invention is to increase the size of the container in order to have a multitude of servings from the same container, without bringing the stored product into contact with oxygen during the dispensing process of any of the portions dispensed. Another goal is to assure a certain simplicity of the dispensing device, without adding additional supplies of nitrogen gas.

The product container 1 in the system of the invention is pressurized with nitrogen gas: each time a product or dose is dispensed from it, the nitrogen gas occupying the headspace of the container expands to the volume released by the dispensed product dose, and no oxygen can go into the container 1. The initial pressure of the nitrogen gas in the headspace of the container is calculated in such a way that, even after the last food product or last dose being dispensed out of the container, there is still a positive pressure difference with the outside pressure, ensuring that no oxygen gets into the container.

According to a first embodiment of the invention (shown in FIGS. 1-15) the product container 1 in the system of the invention is a gas tight container having a tight closing under pressure with a dispensing ball valve 7 allowing the dispensing of the product. This configuration allows the opening of the container and the dispensing of the product (product dose) into a dosing chamber 70 by just rotating the dispensing ball valve 7. The doses provided by the system of the invention are volumetric doses. The dosing chamber 70 works as a kind of buffer volume in the system of the present invention, allowing the product dose exiting the container remaining under pressure (no oxygen can enter this volume) in this volume, which can be considered like an extended total volume of the inner volume 3 of the container 1: once the dispensing ball valve 7 has reclosed, this buffer volume or dosing chamber 70 volume can be put at atmospheric pressure before the dose is finally delivered. Once the container 1 is closed again, the container is tight against outside air, keeping therefore the remaining product in it fresh. Thus, the main goal of the invention is achieved, by allowing both product storage and product dispensing in controlled atmosphere, without any oxidation.

Figure 4:
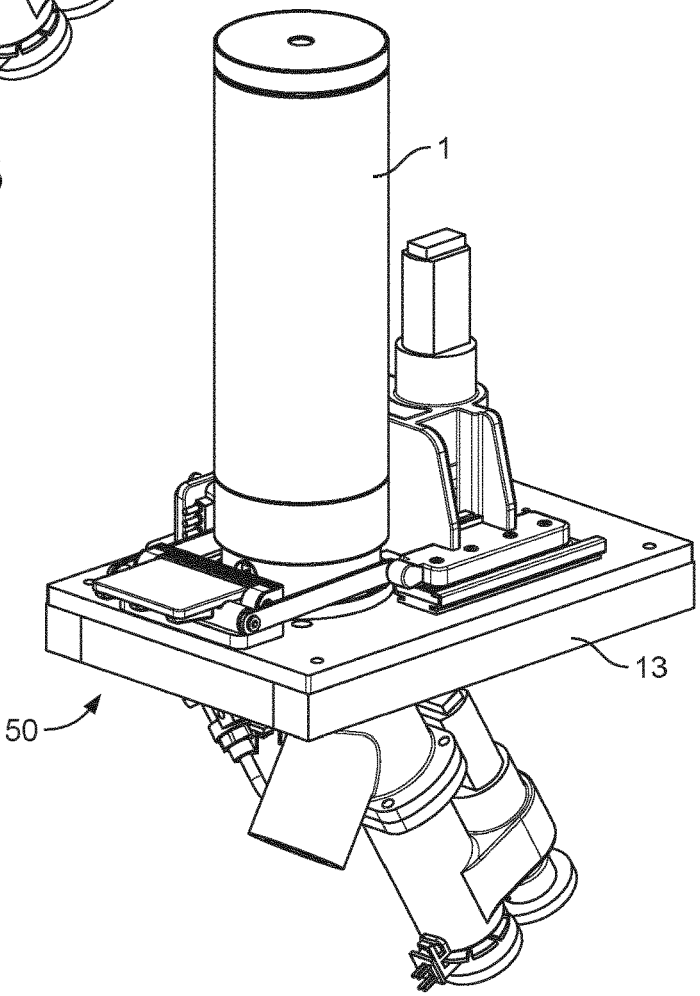
FIG. 4 shows a general view of the complete multi-serving product dispenser system for multiple dosing of a food product according to the present invention, comprising a product container and a dosing mechanism.

As described, the multi-serving product dispenser system of the invention comprises a product container 1 and a dosing mechanism 50, as represented in FIG. 4. The product container 1 is tightly connectable to a dosing mechanism 50, the whole system (container and mechanism) being then connectable to a beverage preparation machine delivering a final beverage. The product container 1 comprises multiple product doses: the product is pressurized with an inert gas, typically nitrogen, and comprises a dispensing mechanism (dispensing ball valve 7 according to a first embodiment of the invention) able to dispense the required product dose into the dosing mechanism 50 preventing any oxidation during the dispensing. The dosing mechanism 50 allows dosing of the correct product weight out of the product container 1, keeping the product in a controlled atmosphere and prevented from any contact with oxygen during opening, product dispensing and closing of the container. The system of the invention is connectable to a beverage preparation machine collecting the dosed amount of product from the dosing mechanism 50 and transforming it into a final beverage (typically by brewing or the like).

Looking at FIG. 1, a product container 1 according to a first embodiment of the invention is represented: the inner volume 3 of the container 1 is pressurized with an inert gas, typically $N_2$. The container 1 comprises a dispensing mechanism configured as a dispensing ball valve 7: this valve 7 is able to rotate from a closed position where no product can be removed from the inner volume 3, to an open position where the product can be delivered into a dosing chamber 70. Typically, the product container 1 is filled and pressurized with $N_2$ through the dispensing ball valve 7 being open, in the factory or at a shop refilling station (the containers of the invention are configured to be reusable, so when the product inside of them has been fully delivered, they can be refilled with product in shops where refilling stations will be provided). Once the container has been filled for the first time or refilled, the valve 7 closes to a close position (typically by rotation of it of 90° from an open position) and the container 1 is ready for shipping or storing, as shown in FIG. 1 or in FIG. 2. As represented in FIG. 1, the ball valve 7 is comprised in a technical cap 4, which is part of the product container 1. The ball valve 7 is rotatable actuated by an axis connecting in an interface for rotation 5, so changing from open to close positions. To allow a better dispensing of the product in the inner volume 3, the container 1 can optionally further comprise an inner spring 10, which is actuated by the rotation of the ball valve 7 via a gear wheel 8 and a rotatable spring support 9.

Figure 2:
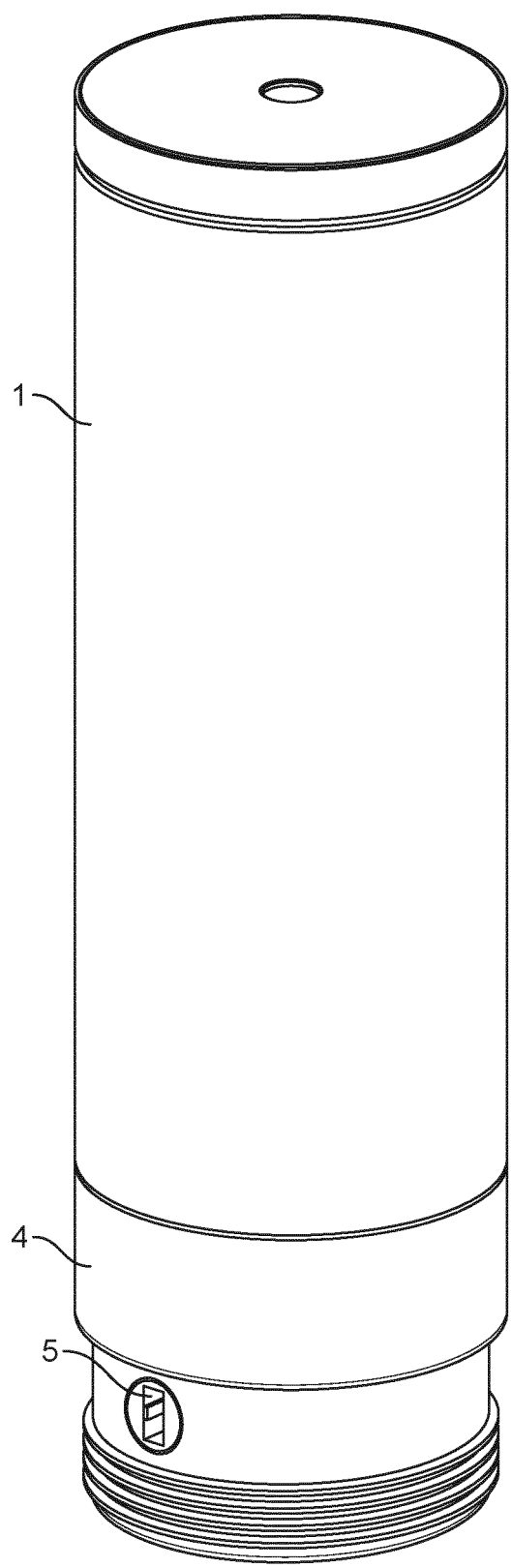
FIG. 2 shows an overview of the product container according to a first embodiment, as shown in FIG. 1, used in a multi-serving product dispenser system for multiple dosing of a food product according to the present invention.

FIG. 2 shows an external view of the product container 1, comprising a technical cap 4 with the ball valve 7 inside, and also showing the interface for rotation 5, where an axis will connect in order to rotate the ball valve 7 and the spring 10 together with it for an easier dispensing of the product.

Figure 3:
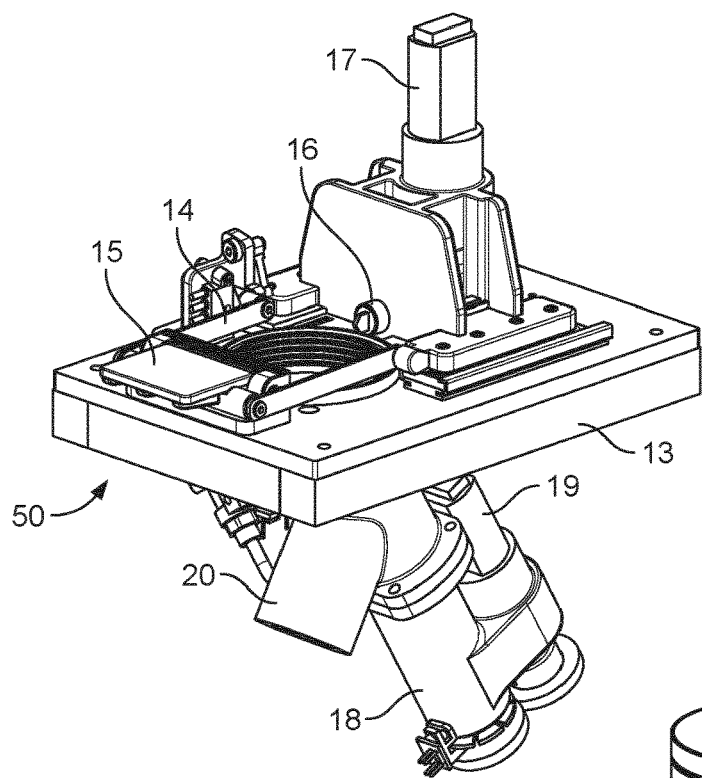
FIG. 3 shows a general view of the dosing mechanism used in a multi-serving product dispenser system for multiple dosing of a food product according to the present invention, where the product container will be connected to the dosing mechanism by screwing.

The dosing mechanism 50 is represented in FIG. 3. According to a possible embodiment of the system, the container 1 is tightly connected to the mechanism 50 by screwing. The dosing mechanism 50 comprises a chassis 13, and also a container docking element 14 and a container locking 15 in order to properly fix the container 1. As further shown in FIG. 3, the dosing mechanism 50 comprises a dispensing motor 17 driving an axis 16 connecting to the interface for rotation 5 in the container 1 and so actuate the ball valve 7 (and optionally also the inner spring 10). The dosing mechanism 50 also comprises a dosing cylinder 18 actuated by a delivery motor 19. The product is delivered to a beverage preparation machine through a product delivery tube 20.

FIG. 4 shows a complete overview of the system of the invention, with the product container 1 tightly connected to the dosing mechanism 50. According to a possible embodiment of the invention, the product container 1 is screwed to the dispensing mechanism 50, as shown in FIGS. 3 and 4, thus providing a tight connection of the said container 1.

Figure 5:
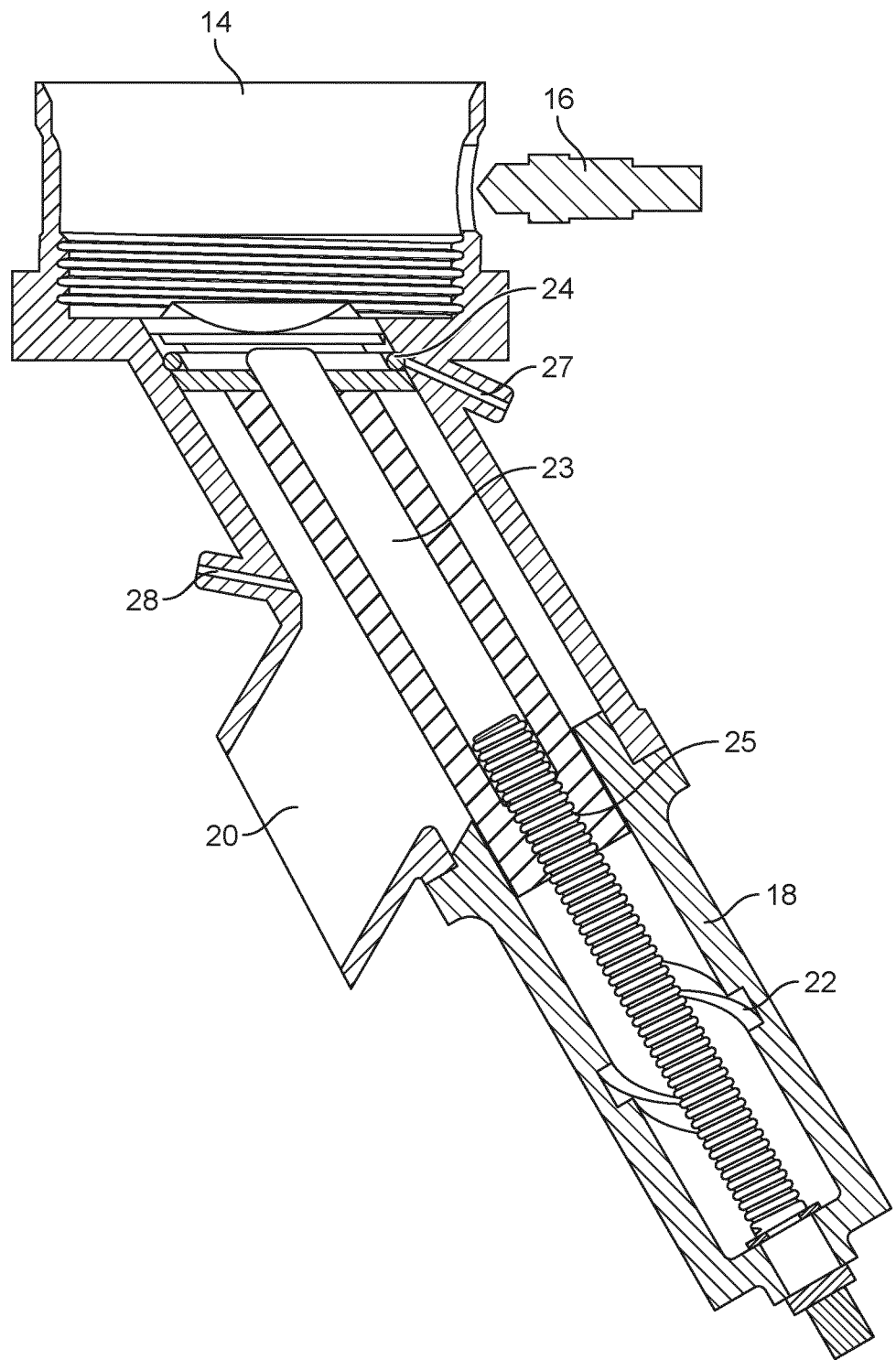
FIG. 5 shows a detailed cut view of the container docking for connection of the product container to the dosing mechanism, in a multi-serving product dispenser system for multiple dosing of a food product according to the present invention, the product container will be connected to the dosing mechanism by screwing.
Figure 15:
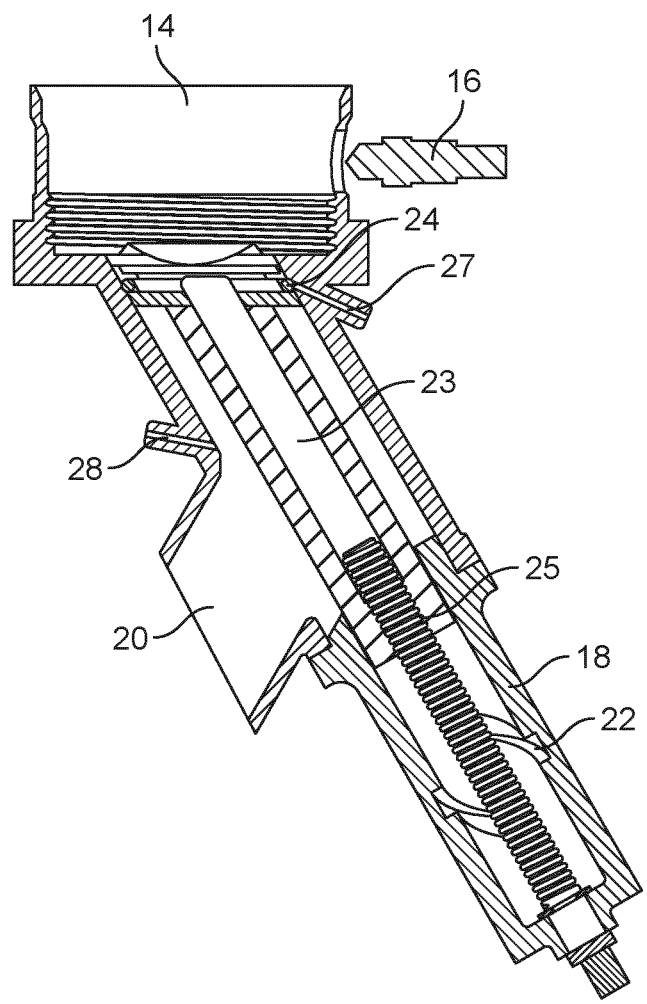
FIG. 15 shows a detailed cut view of the container docking for connection of the product container to the dosing mechanism, in a multi-serving product dispenser system for multiple dosing of a food product according to the present invention, after the container has been removed from the dosing mechanism.

Looking at FIG. 5, the part of the dosing mechanism 50 connecting to the product container 1 is shown in further detail, with a cut view: the container 1 will connect in a corresponding container docking 14 and the axis 16 will then connect to the container 1 through the interface for rotation 5, and will thus rotate the dispensing ball valve 7 as required. A piston 23 is moved thanks to a piston screw 25, all provided in the dosing mechanism 50. The piston 23 can move in a tight manner thanks to a piston seal 24. A guide element 22 is further provided: it allows the guidance of the movement of the piston 23 and it further allows a rotation of this piston 23 of 180° in order to help the product fall out of the piston 23. Furthermore, the dosing mechanism 50 is also provided with an air evacuation tube 27 in order to evacuate the remaining oxygen once the piston 23 is moving back to its initial position: a second air channel 28 in order to help the emptying of the piston 23 in open position is also comprised in the dosing mechanism 50. FIG. 15 shows a similar representation than that of FIG. 5.

Figure 6:
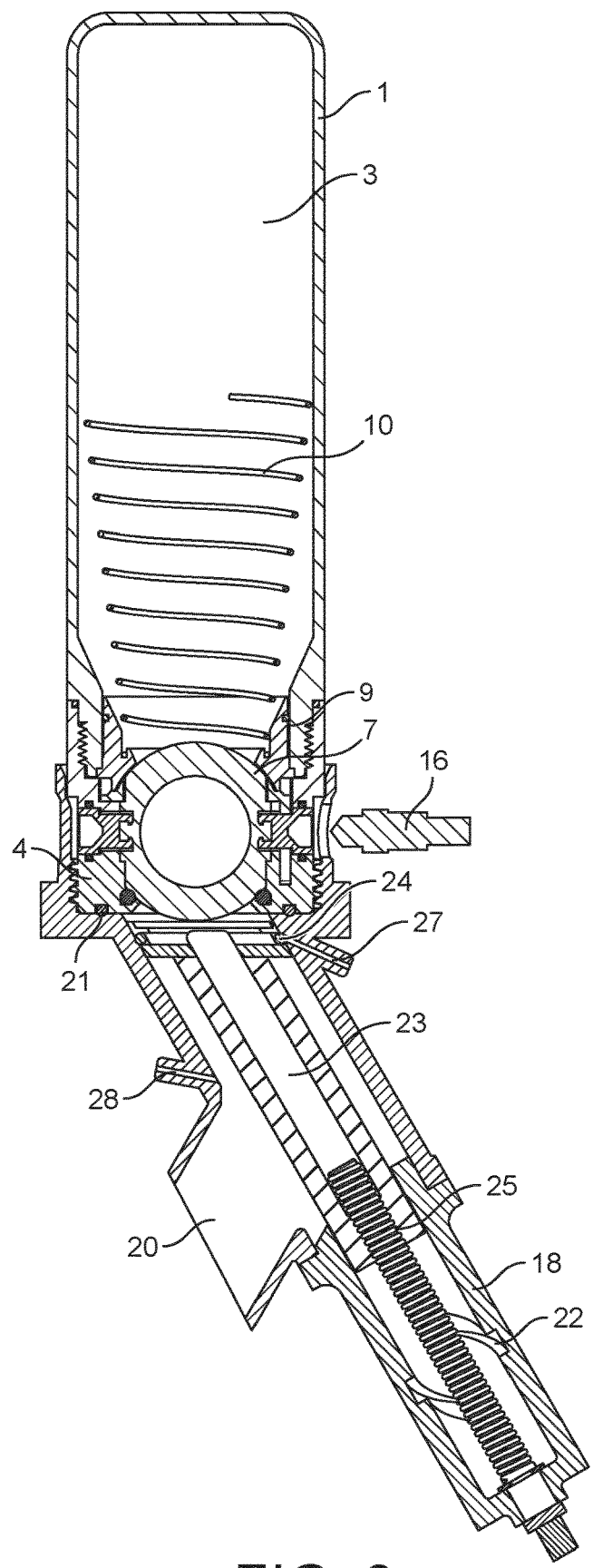
FIG. 6 shows a cut view of the multi-serving product dispenser system for multiple dosing of a food product according to the present invention, before the axis of the dispensing motor is connected to the product container.

FIG. 6 shows a cut view representative of the product container 1 connected to the dosing mechanism 50 (piston part). In this Figure it can also be seen that the tightness of the connection of the container 1 to the dosing mechanism is reinforced by a tightness seal 21. The system of the invention comprises a dispensing part (product container 1) where the product in the inner volume 3 of the container 1 will be dispensed to the dosing mechanism 50, and a delivery part (piston 23) where the product coming from the container 1 will be sent through a product delivery tube 20 towards a beverage preparation machine.

Figure 7:
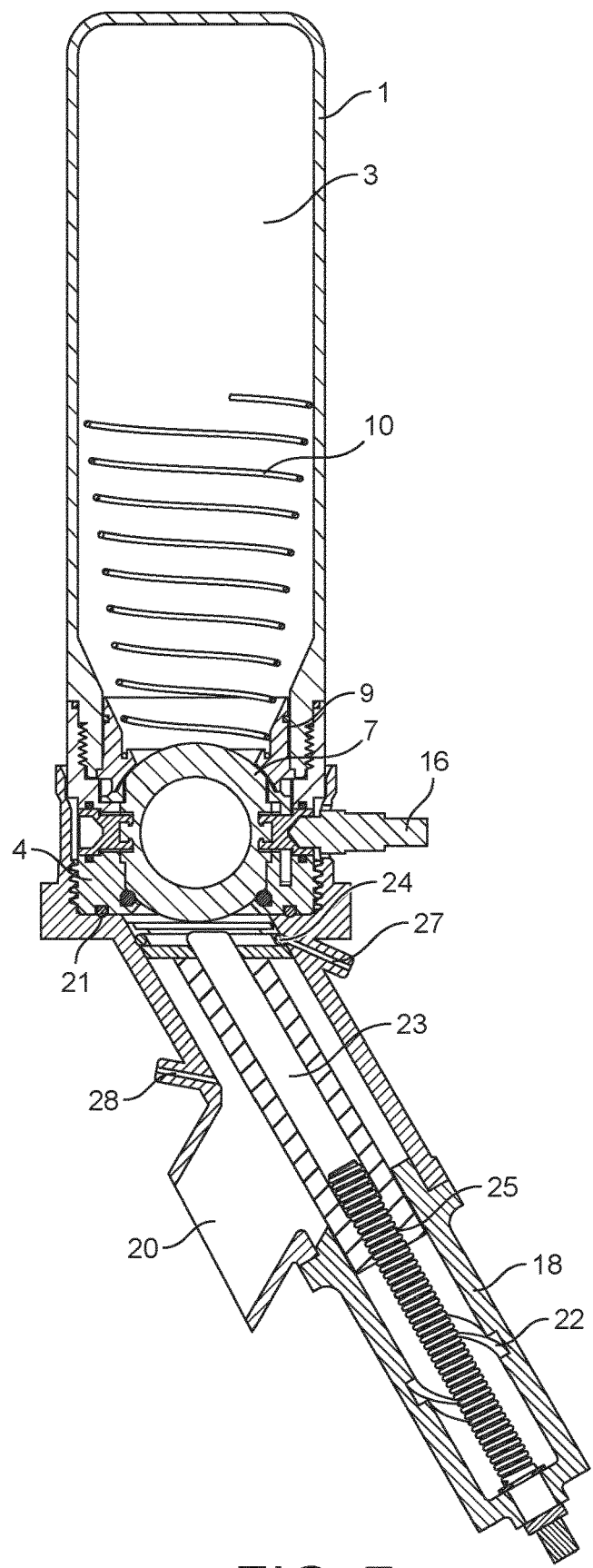
FIG. 7 shows a cut view of the multi-serving product dispenser system for multiple dosing of a food product according to the present invention, once the axis of the dispensing motor has connected to the product container.

FIG. 7 shows a cut view of the connection of the product container 1 to the dosing mechanism in an initial position, where the dispensing ball valve 7 is closed, also showing the connection of the axis 16 into the interface for rotation 5 in the container 1. In the configuration shown in FIG. 7, the air evacuation tube 27 is closed.

The operation and way of working of the system of the invention will be described in what follows now, making reference to FIGS. 7-14.

The initial position of a connected product container 1 to a dispensing device 50 is represented in FIG. 7: the dispensing ball valve 7 is in a closed position and allows no dispensing of product from its inner volume 3. In this Figure, the pressurized product container 1 is connected to the dosing mechanism 50: the piston 23 in the dosing mechanism 50 is in closed position, and there is a zero gap between the dispensing ball valve 7 and the piston 23.

Figure 8:
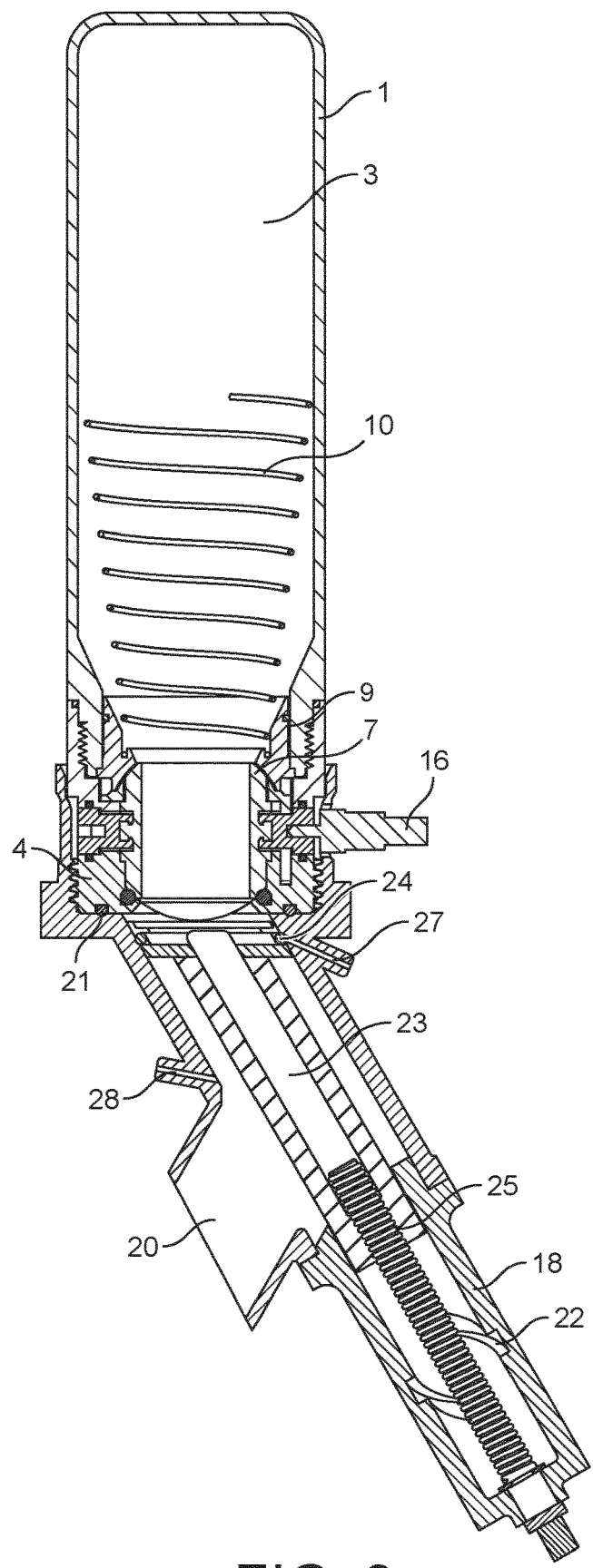
FIG. 8 shows a cut view of the multi-serving product dispenser system for multiple dosing of a food product according to the present invention, when the dispensing ball valve has rotated and the product container is open.
Figure 9:
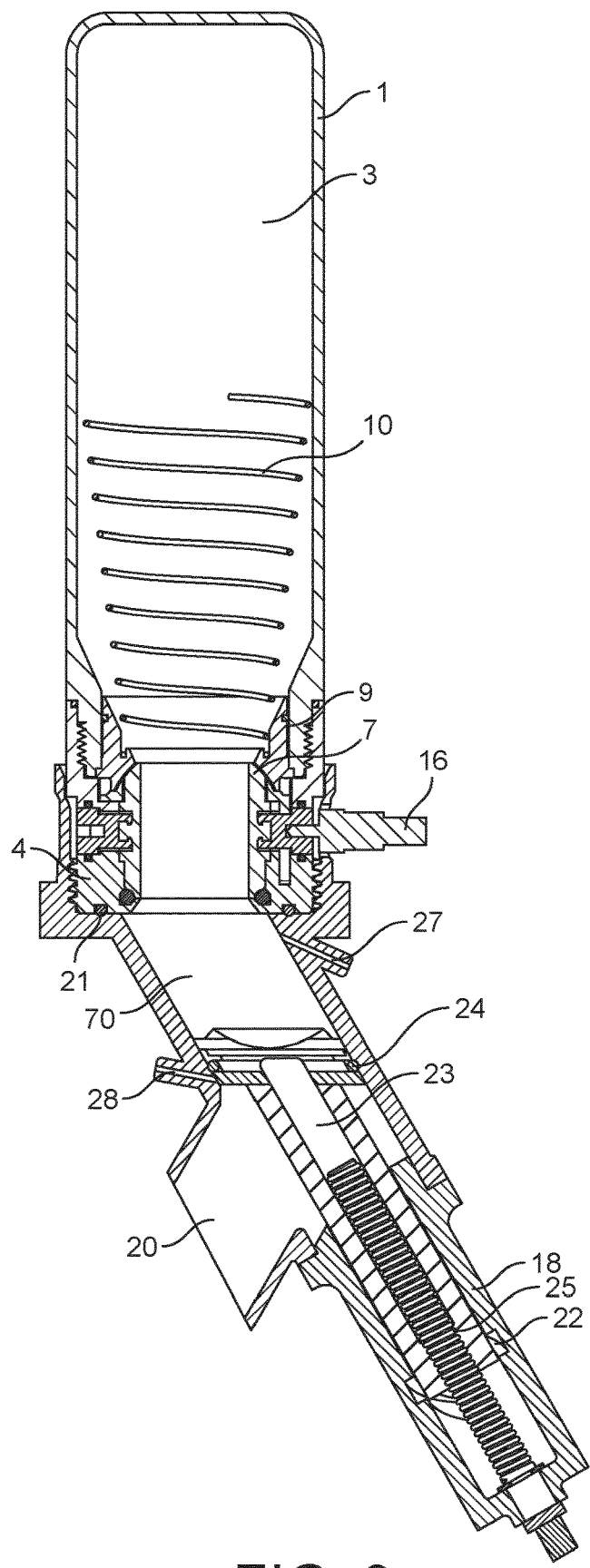
FIG. 9 shows a cut view of the multi-serving product dispenser system for multiple dosing of a food product according to the present invention, when a certain quantity of product has gonne into the dosing cylinder, for delivery.

Once a certain quantity of product (dose) from the container 1 is desired, the dispensing ball valve 7 is first rotated 180° (by the actuation of the axis 16) to an open position that would allow the product inside to go out of the inner volume 3, as represented in FIG. 8.

Once a certain dose of product (certain quantity) has been selected, after the ball valve 7 has rotated to the open position in FIG. 8, the piston 23 moves down (thanks to the piston screw 25) in order to free a certain volume in the so called dosing chamber 70. Therefore, once the piston 23 has moved down, the required dose of product to be later delivered fills the volume of the dosing chamber 70. According to a preferred embodiment, the rotation of the valve 7 is linked with the rotation of the inner spring 10 in the inner volume 3 of the container 1: the rotation of the spring 10 occurs thanks to the gear wheel 8 and the spring support 9. This rotating spring 10 allows a better dispensing of the product into the dosing chamber 70. Thanks to the overpressure of the product container 1 and the tight connection of the container to the dosing mechanism 50 by the tightness seal 21, the inner volume 3 of the container and also the dosing chamber 70 (now making a unique bigger chamber) remain in a controlled pressurized $N_2$ atmosphere, keeping oxygen out. During the moving of the piston 23 down, the air evacuation tube 27 remains closed.

Figure 10:
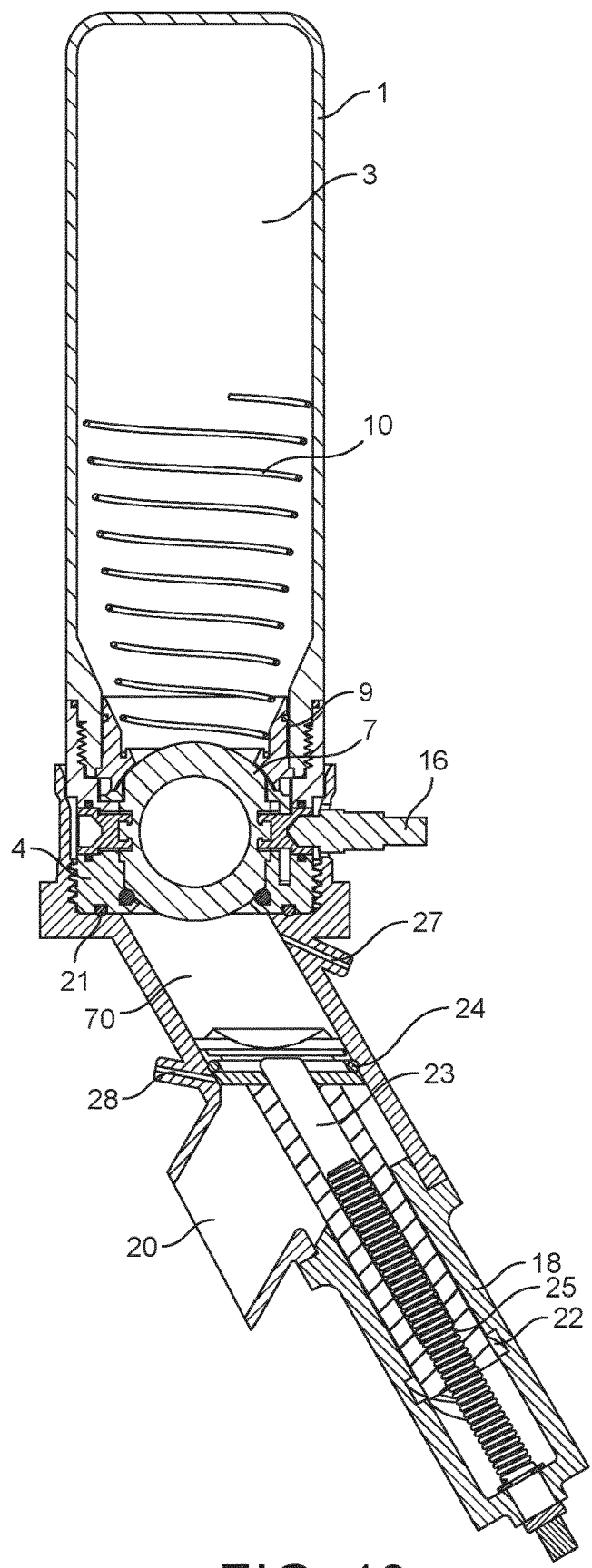
FIG. 10 shows a cut view of the multi-serving product dispenser system for multiple dosing of a food product according to the present invention, after the position in FIG. 9, when a certain quantity of product has gonne into the dosing cylinder and the dispensing ball valve has reclosed.

Once the required product dose is dispensed into the dosing chamber 70, the dispensing ball valve 7 rotates again 180° and gets to a closed position, as represented in FIG. 10. The air evacuation tube 27 is still closed and so the product in the dosing chamber 70 is under pressure ($N_2$).

Figure 11:
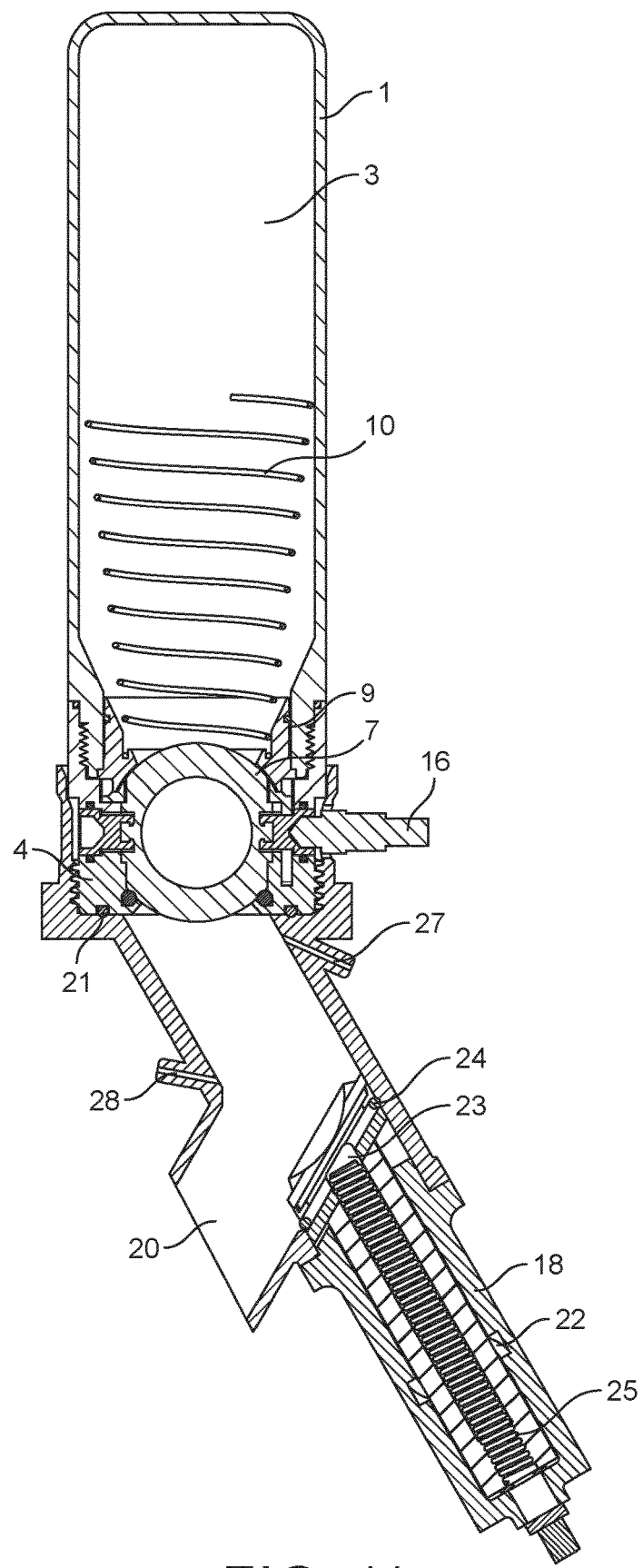
FIG. 11 shows a cut view of the multi-serving product dispenser system for multiple dosing of a food product according to the present invention, after the position in FIG. 10, when the product from the dosing cylinder goes into the product delivery tube.

The following step is represented in FIG. 11: the piston 23 continues to move down, thanks to the piston screw 25: as the dosing chamber 70 is opened to the product delivery tube 20, the product in the chamber 70 goes under atmospheric pressure and is delivered via the tube 20 to the beverage preparation machine (it is only at this moment that the product goes into contact with oxygen). The piston 23 is turned 180° thanks to the piston guide element 22, as shown in FIG. 11, in order to help the product fall into the tube 20. Also, air is blown through a second air channel 28 to help product emptying (from the dosing chamber 70 into the delivery tube 20).

Figure 12:
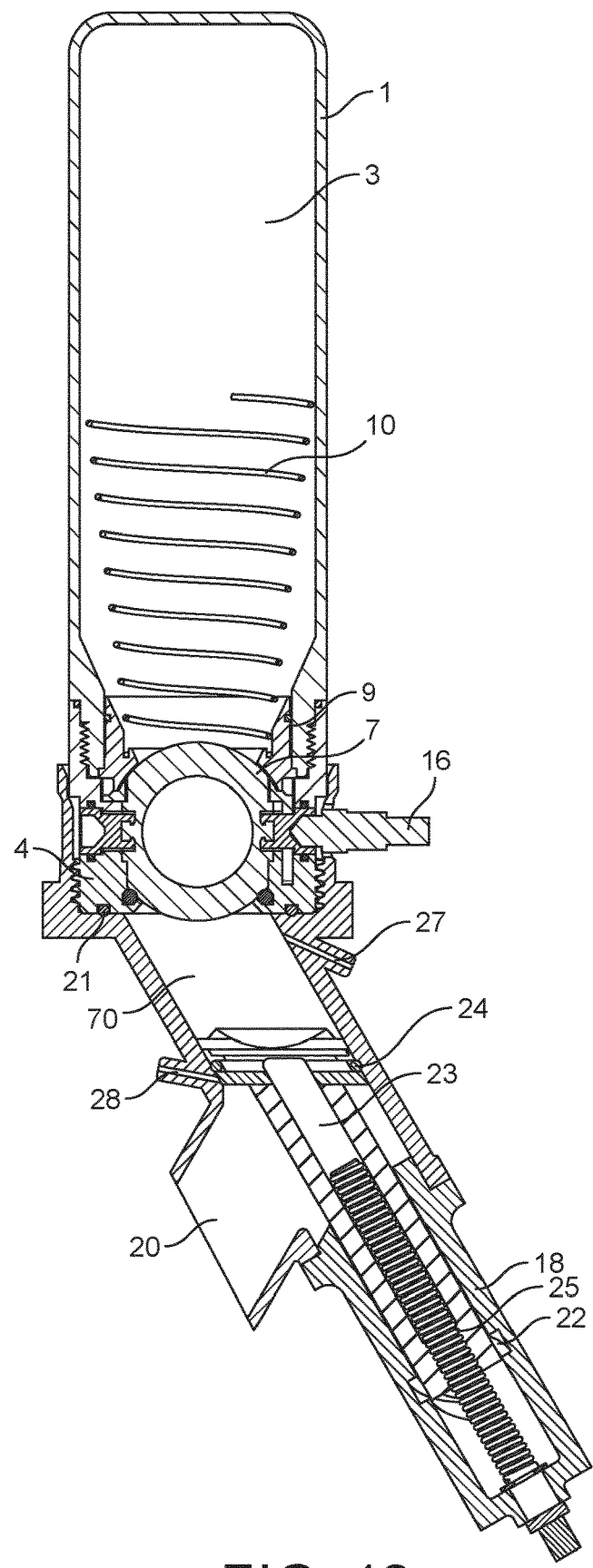
FIG. 12 shows a cut view of the multi-serving product dispenser system for multiple dosing of a food product according to the present invention, after the position in FIG. 11, when the dosing cylinder has gone up in order to remove the air from the piston chamber.
Figure 13:
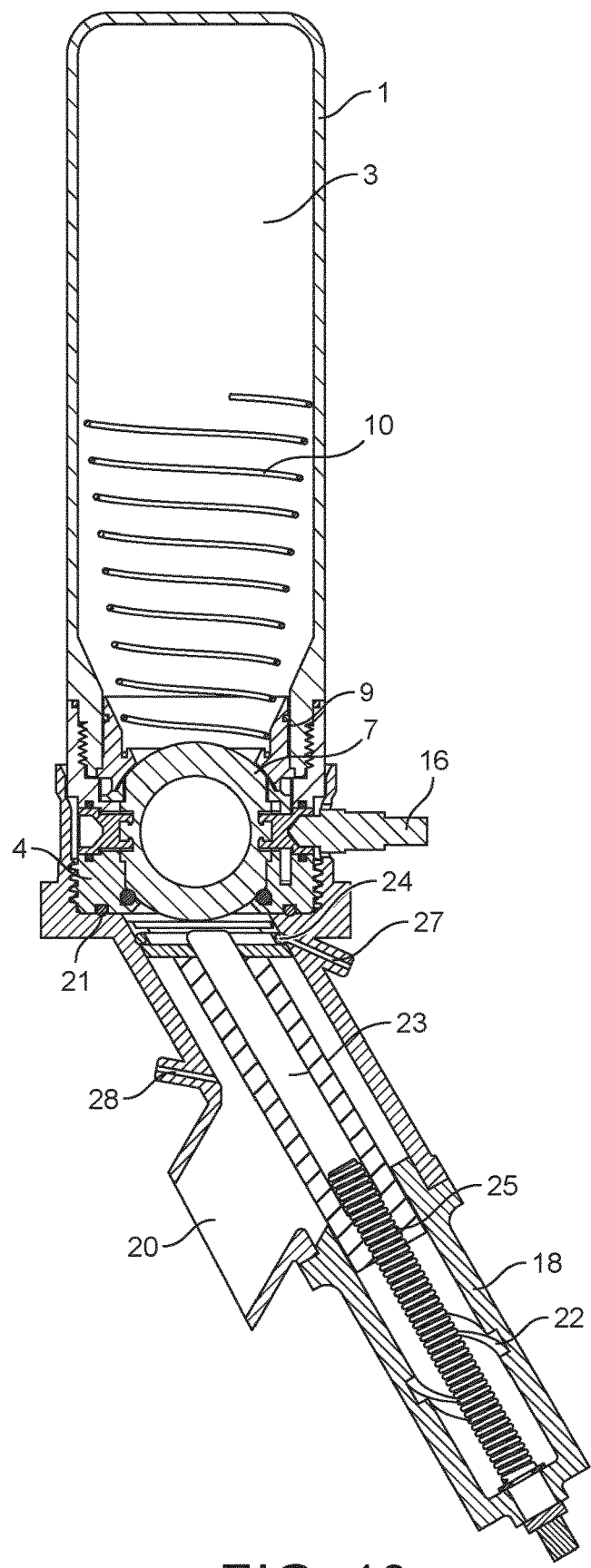
FIG. 13 shows a cut view of the multi-serving product dispenser system for multiple dosing of a food product according to the present invention, after the position in FIG. 12, when the dosing cylinder has gone up to the initial position shown in FIG. 7.
Figure 14:
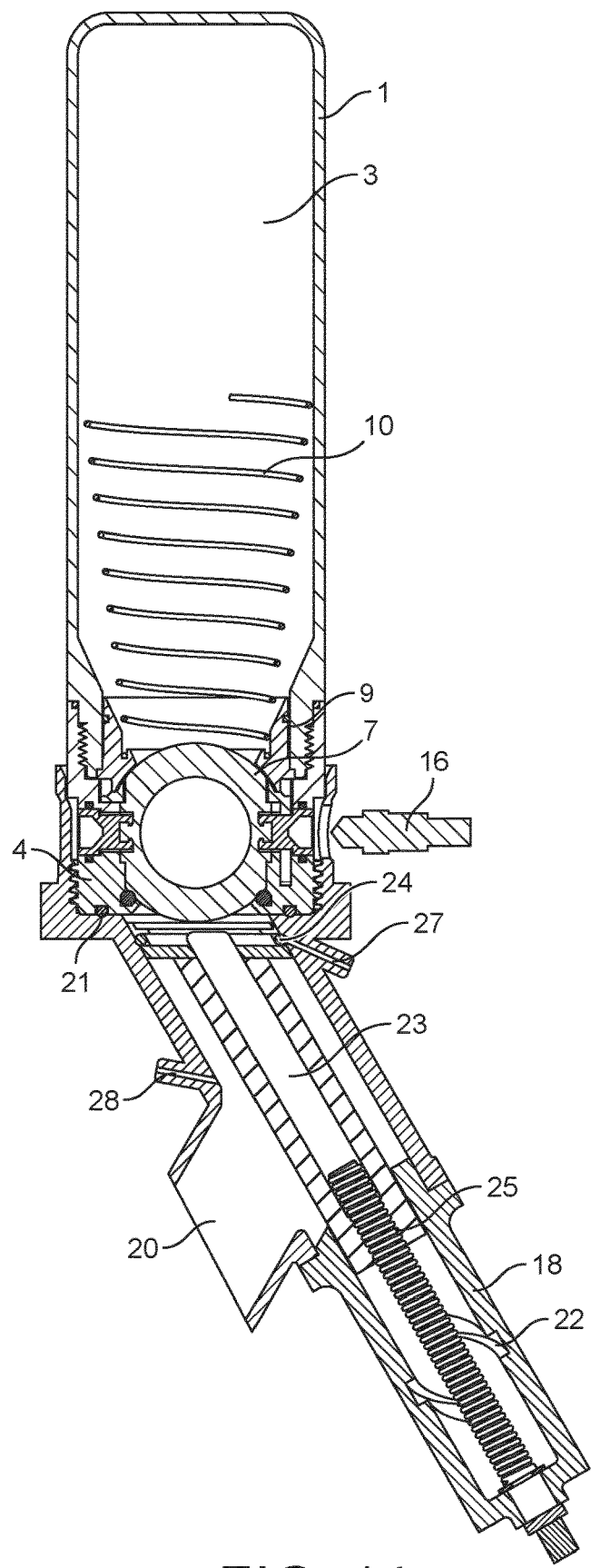
FIG. 14 shows a cut view of the multi-serving product dispenser system for multiple dosing of a food product according to the present invention, after the position in FIG. 13, when the axis of the dispensing motor has been disconnected from the product container, and so the product container can be removed from the dosing mechanism, if so desired.

In the next step, as shown in FIG. 12, once the product has been delivered out through the product delivery tube 20, the piston 23 starts to move back to its original position, and the remaining air in the dosing chamber 70 is pushed out into the atmosphere through the air evacuation tube 27: when the product has been delivered and the piston moves back to its position, the air evacuation tube 27 is opened by actuation of a valve (not shown). FIG. 13 then shows the piston 23, which has moved back to its original position: the valve acting on the air evacuation tube 27 closes this tube and so the system is then ready for a delivery of the next dose, as this next dosing has to be done at controlled pressure, once again. As it will be further explained with more detail, the pressure in the product container 1 initially (initial status with no dosing made) is calculated in such a way that a positive pressure inside is always maintained during the emptying of the container (i.e. throughout the whole dosing cycles). After a dosing of product has been made, the product container 1 can stay plugged or attached to the dosing mechanism 50 (and so, typically arranged on the beverage preparation machine) or the container can be removed so another product container is plugged, for example (in this case, the axis 16 disconnects from the interface 5 as shown in FIG. 14 and so the product container 1 can be properly removed).

A different embodiment alternative to the dispensing ball valve 7 described is represented in FIGS. 16, 17, 18 and 19.

Figure 17:
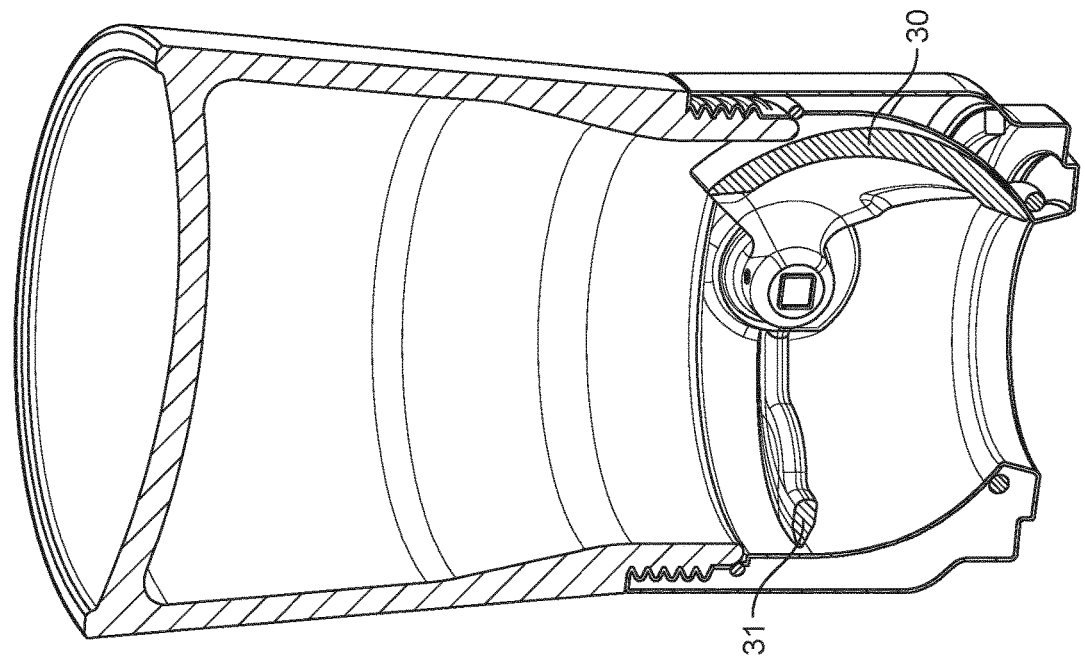
FIG. 17 shows a cut view of the product container according to a second embodiment used in a multi-serving product dispenser system for multiple dosing of a food product according to the present invention in a different position as the one shown in FIG. 16.
Figure 16:
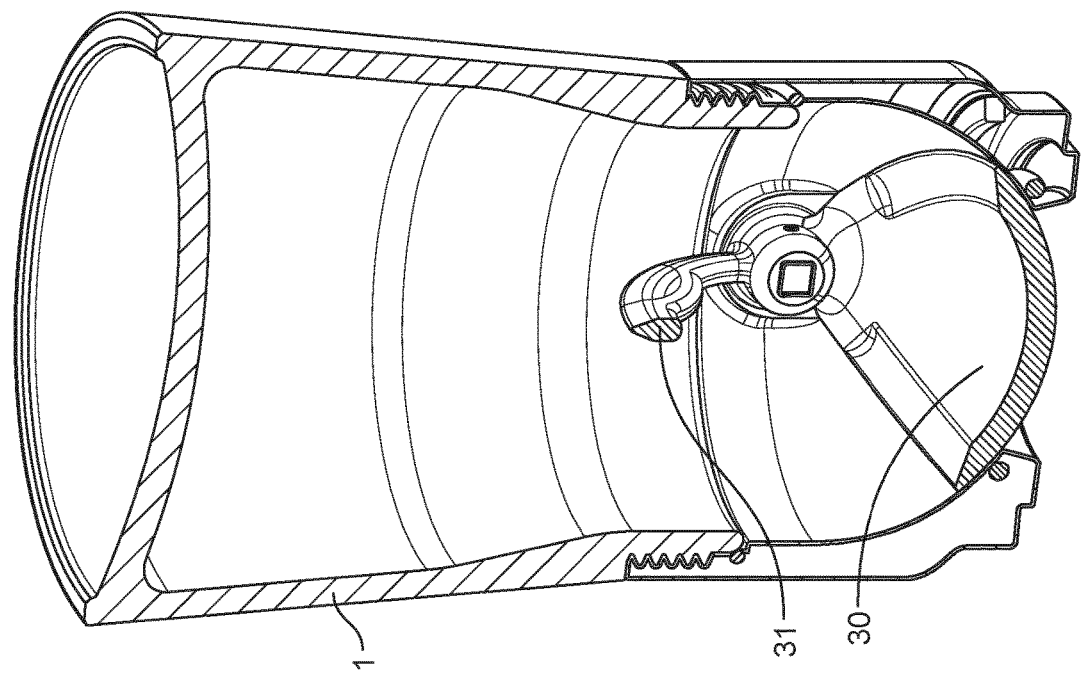
FIG. 16 shows a cut view of the product container according to a second embodiment used in a multi-serving product dispenser system for multiple dosing of a food product according to the present invention.
Figure 19:
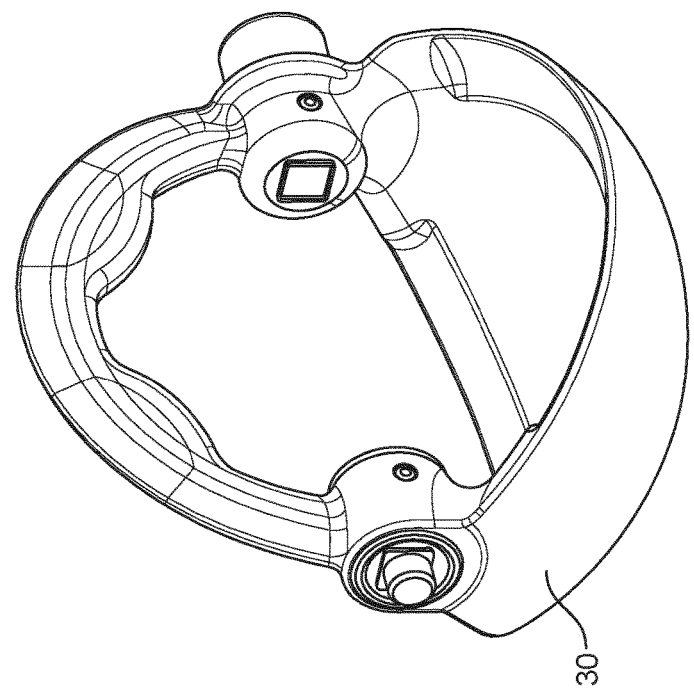
FIG. 19 shows in detail the configuration of the rotating element in the product container according to a second embodiment used in a multi-serving product dispenser system for multiple dosing of a food product according to the present invention.
Figure 18:
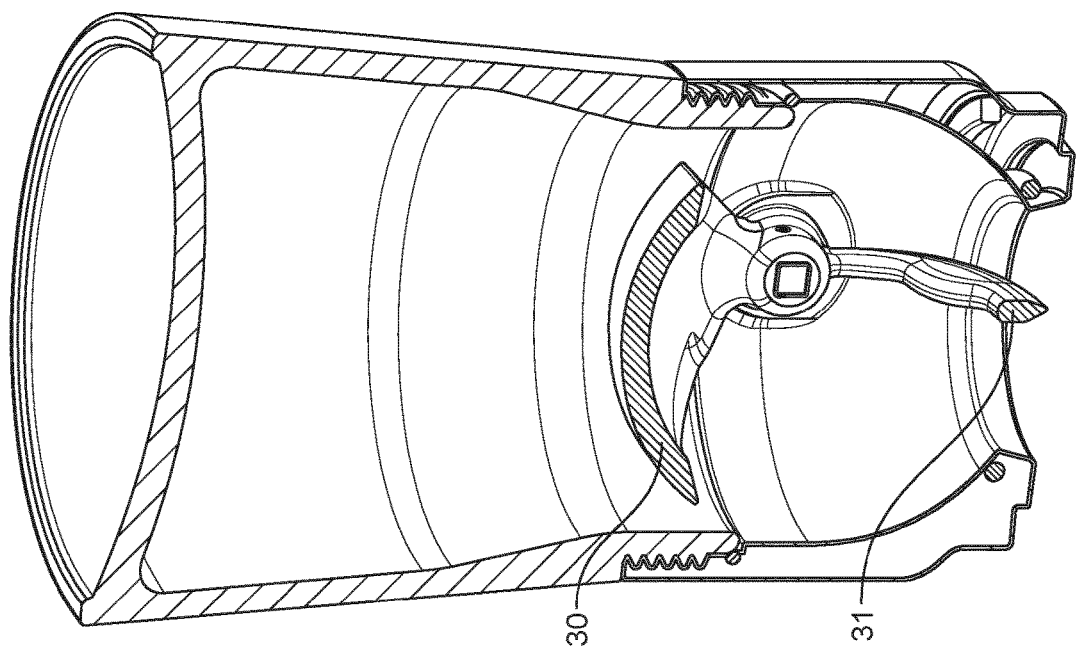
FIG. 18 shows a cut view of the product container according to a second embodiment used in a multi-serving product dispenser system for multiple dosing of a food product according to the present invention in still a different position as the one shown in FIG. 17.

In FIG. 16, it is represented in a cut view the container 1 having the lower aperture through where the product inside the volume 3 will be dispensed to the dosing chamber 70. Instead of a dispensing ball valve 7, a spherical ball valve 30 (partial valve and not configured in 360°) is used now instead for this embodiment. This configuration is more simple and has less complexity than the one with the dispensing ball valve 7, and is also lighter. By rotating the valve 30, the container is opened or closed towards the dosing mechanism 50. The valve 30 further comprises a blade element 31 jointly rotating with the valve, so the product in the container is mixed before being dispensed, in order to prevent bridging or caking of the product. The blade 31 will be configured having a certain shape in order to allow a better and more homogeneous mixing of the product. The configuration of the complete rotatable tool is represented in FIG. 19, with the spherical ball valve 30 on one side and the mixing blade 31 on the opposite side. Both parts rotate jointly and as one single piece, with a double objective: mixing the product and opening/closing the container's communication with the dosing mechanism 50 (towards the dosing chamber 70). As in the first embodiment, the connection with the dosing mechanism 50 is done through the interface for rotation 5, with an axis 16 actuated by a dispensing motor 17. FIG. 16 shows the spherical ball valve 30 closing the container 1; FIG. 17 and FIG. 18 show the valve 30 leaving the container 1 open (two different moments during the rotation of the valve 30 and the mixing blade 31).

Still another possible embodiment of the invention is to have a vertical piston element 23, i.e. moving vertically and aligned with the product container 1, placed in vertical. Once the volumetric product dose has been dispensed to the dosing chamber 70, this element is configured to be able to tilt so as to dispense the product to the outside or to the corresponding beverage preparation machine. Once the dosing chamber 70 tilts, air enters into contact with the dose, which is therefore under atmospheric pressure, similar as in FIG. 11, where the piston element 23 has descended and air enters through the product delivery tube 20. FIGS. 27 *a-b-c*, 28 *a-b-c*, 29 *a-b-c* and 30 *a-b* show this other embodiment of the system of the invention, and it will be explained in more detail in what follows.

Figure 27C:
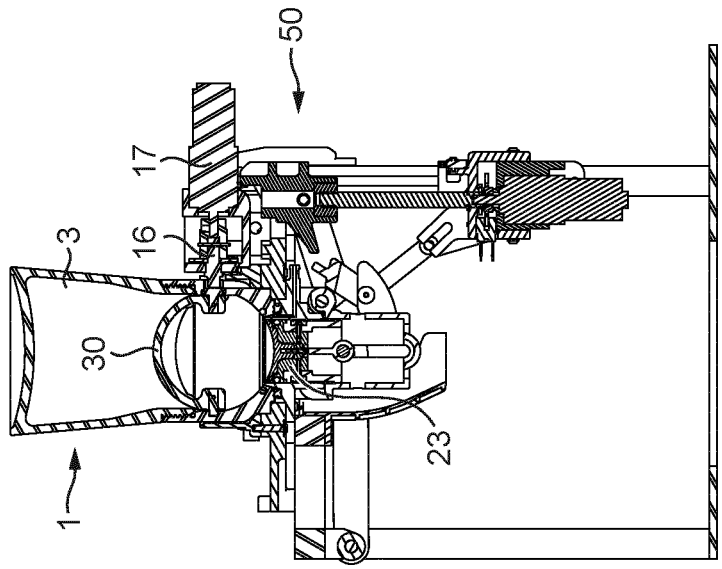
FIGS. 27a-c show cut views of the multi-serving product dispenser system for multiple dosing of a food product according to a different embodiment of the present invention, showing the container closed (FIG. 27b) and the open (FIG. 27c).
Figure 27B:
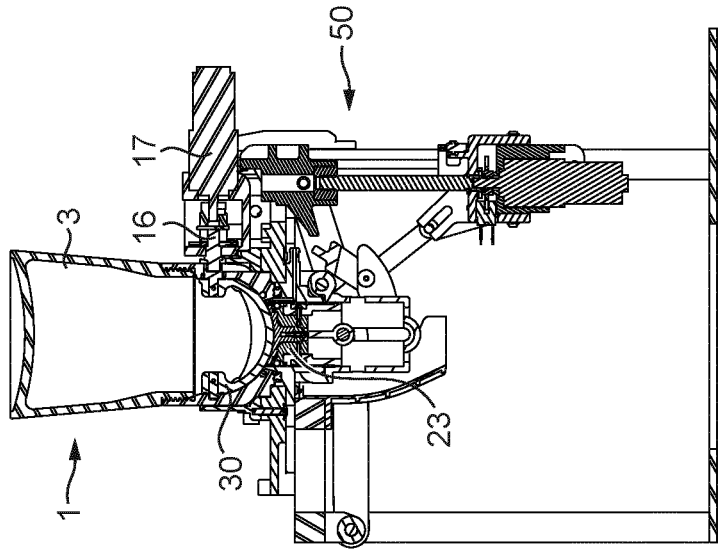
Figure 27A:
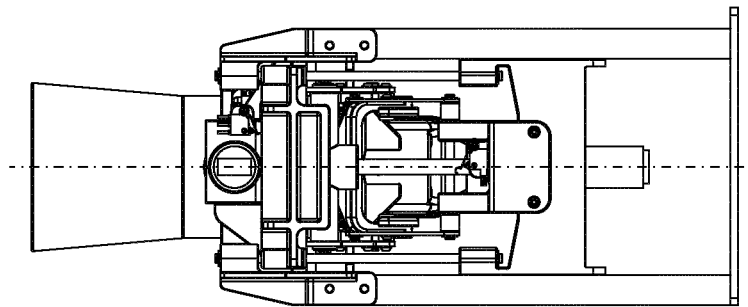
Figure 28C:
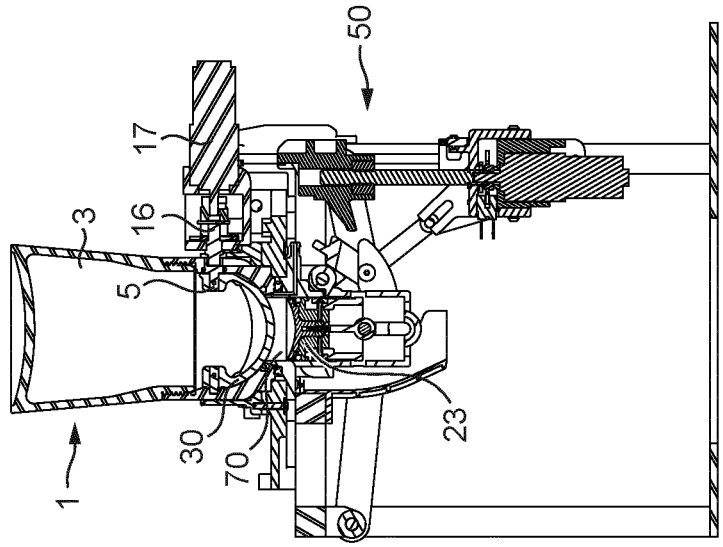
FIGS. 28a-c show cut views of the multi-serving product dispenser system for multiple dosing of a food product according to a different embodiment of the present invention, showing the container open and the product starting being delivered (FIG. 28b) and the container closed again with a dose delivered (FIG. 28c).
Figure 28B:
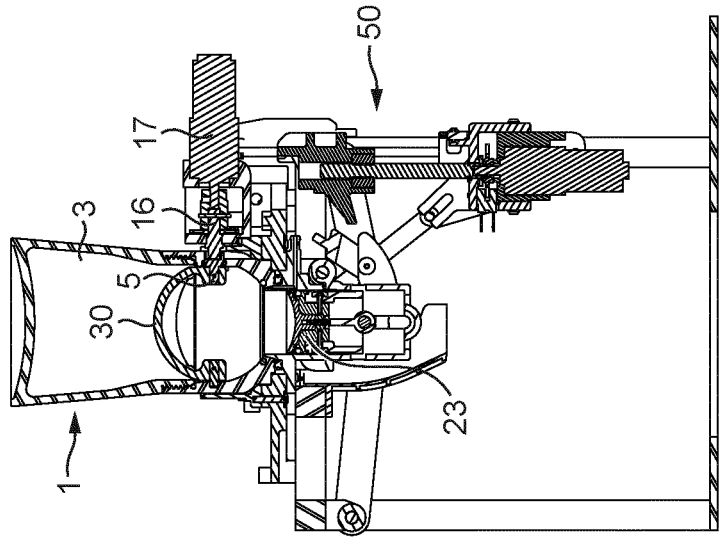
Figure 28A:
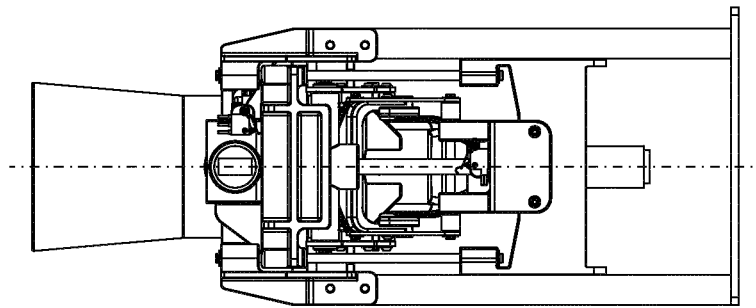
Figure 29C:
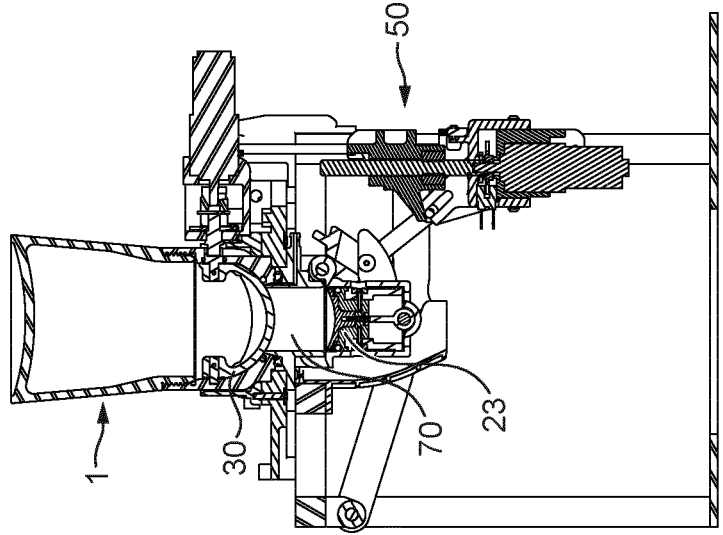
FIGS. 29a-c show cut views of the multi-serving product dispenser system for multiple dosing of a food product according to a different embodiment of the present invention, showing the container closed and the dosing chamber with a bigger volume so as to lower its internal pressure (FIG. 29b) and the container closed and the piston in its final course before opening (FIG. 29c).
Figure 29B:
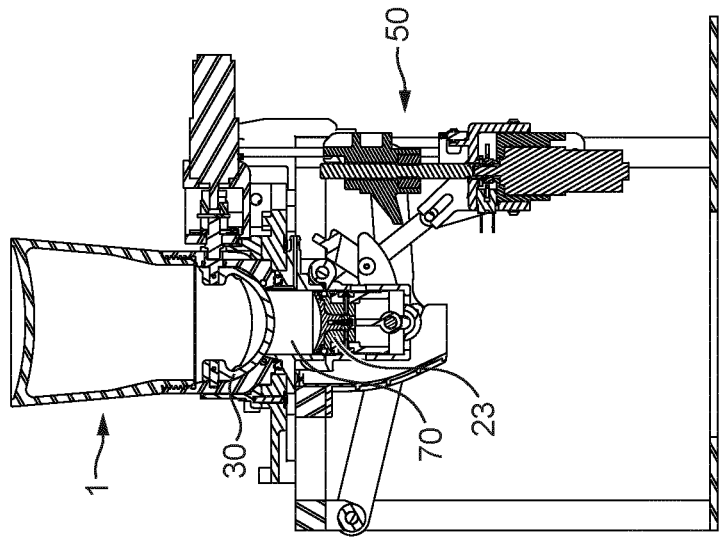
Figure 29A:
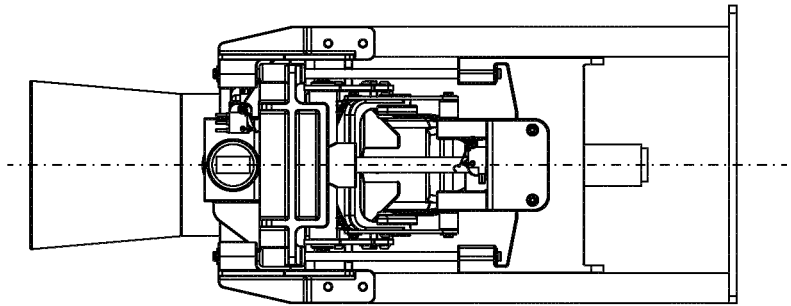
Figure 30B:
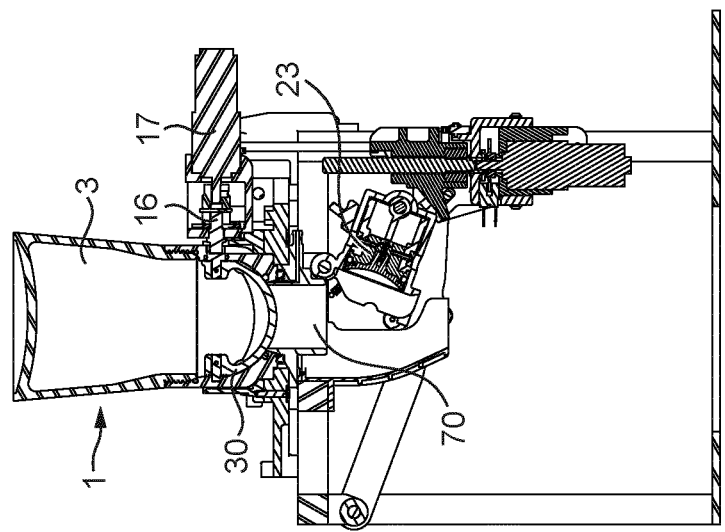
FIGS. 30a-b show cut views of the multi-serving product dispenser system for multiple dosing of a food product according to a different embodiment of the present invention, showing the position where the piston tilts and opens for dispensing the product in the dosing chamber.
Figure 30A:
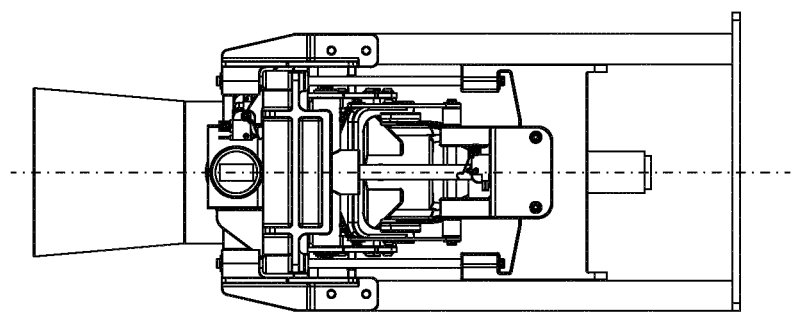

FIGS. 27*b* and 27*c* show a multi-serving product dispenser system according to a further embodiment of the invention, where the piston element 23 is arranged vertically and also moves vertically with respect to the container 1, which is arranged in a vertical position with respect to the dosing mechanism 50, as shown in these Figures. FIG. 27*b* shows the piston 23 in an upper position pushing towards the spherical ball valve 30 which is in a closed position, i.e. closing the outlet of the container 1. The same connection of the ball valve 30 is done as in the other embodiments of the invention, by means of an axis 16 actuated by a motor 17 which rotates the valve 30. FIG. 27*c* shows the position where the spherical ball valve 30 has rotated and has left open the outlet of the container 1. The next step in the delivering of a certain product dose is shown in FIG. 28b, where the valve 30 is open and the piston element 23 starts descending so to deliver the product dose into the buffer or dosing chamber 70: once the dose is into the dosing chamber 70, as represented in FIG. 28c, the spherical ball valve 30 rotates again and closes the container outlet. The next step is shown in FIG. 29b, where the spherical ball valve 30 is still closing the container outlet and the piston element 30 has displaced vertically further down so the volume of the dosing chamber 70 is bigger: this allows the pressure to go down before the piston 23 will open in a later stage. This is a security measure for the case when the pressure in the dosing chamber 70 is too high: if the container volume 3 is highly pressurized, the pressure inside the dosing chamber 70 can go up to even 1.5 bar and be pushed back violently by the residual pressure. FIG. 29c shows the position where the piston element 23 has reached its final course or position before it will be tilted and will open: the spherical ball valve 30 is still in a closed position and closes the outlet of the container 1. Finally, in order to deliver the content of the product dose kept in the dosing chamber 70, the piston element 23 tilts or pivots as shown in FIG. 30b so the dose content in the dosing chamber 70 is put to atmospheric pressure and is then delivered. As represented in this Figure, the spherical ball valve 30 is in closed position and closes the outlet or exit part of the container 1, so no air (no oxygen) can enter inside the volume 3 of the container and thus the remaining product (not delivered) inside the container is preserved in a controlled atmosphere for subsequent dosing.

Figure 20:
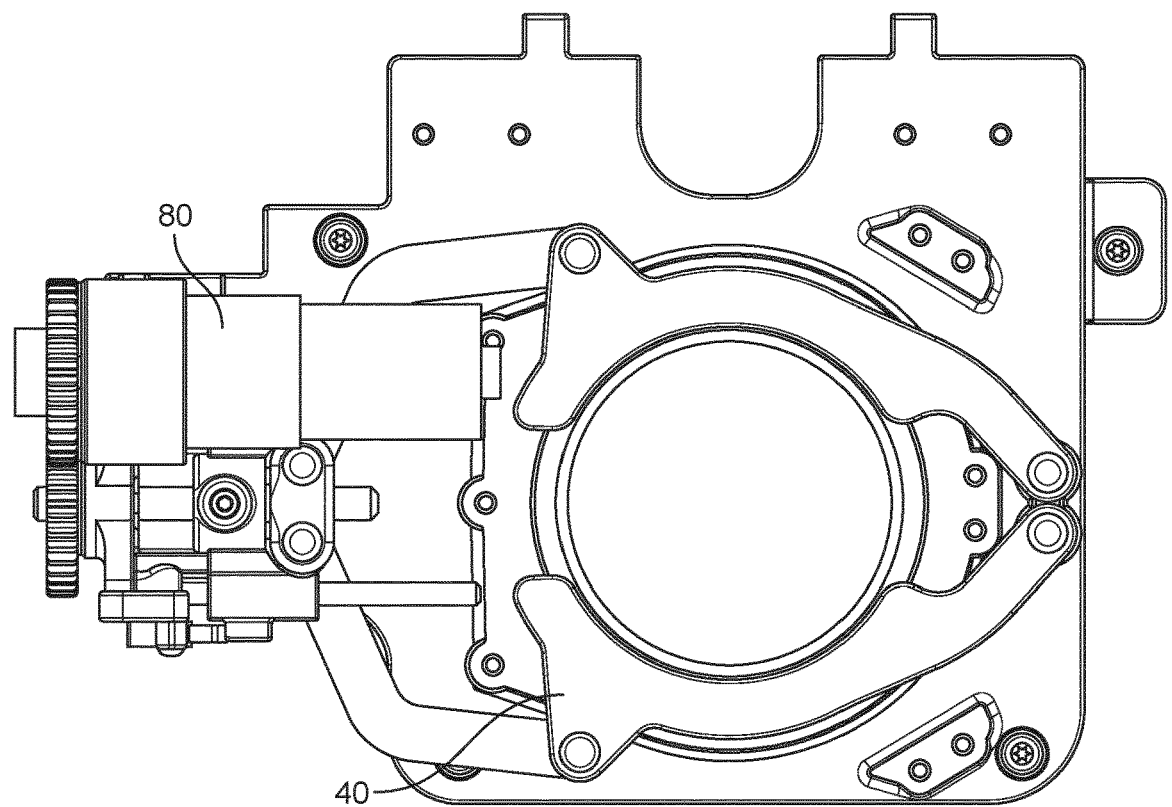
FIG. 20 shows the connection of the product container to the dosing mechanism, in a multi-serving product dispenser system for multiple dosing of a food product according to the present invention, according to a different embodiment, where the product container will be fixed by clamps to the dosing mechanism.
Figure 21:
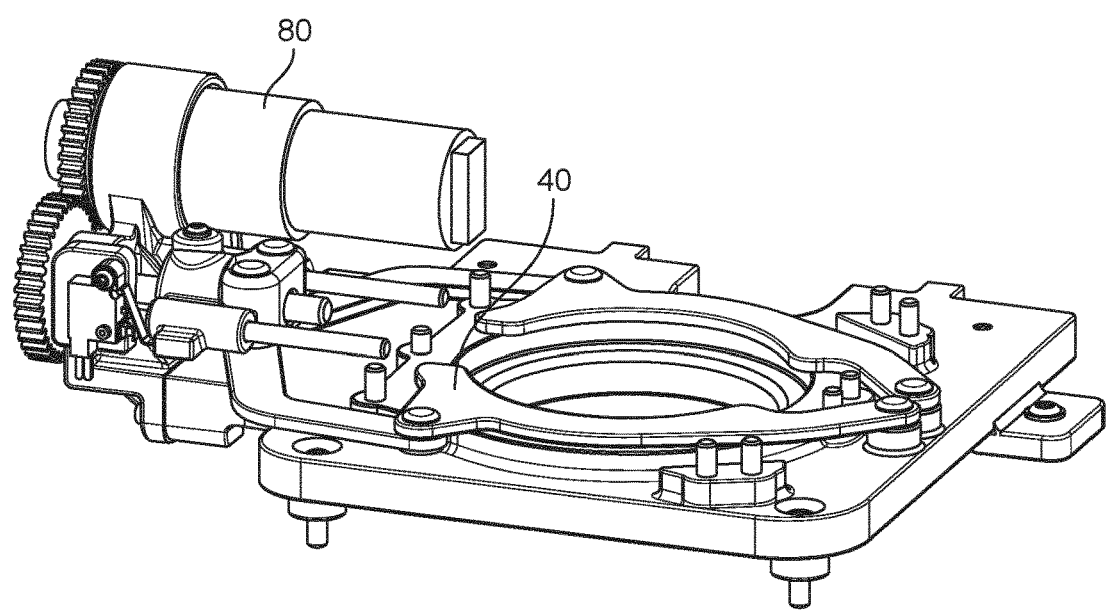
FIG. 21 shows a further detail of the connection of the product container to the dosing mechanism, in a multi-serving product dispenser system for multiple dosing of a food product according to the present invention, as shown in FIG. 20, where the product container is fixed by clamps to the dosing mechanism.

In FIGS. 20, 21, 22 and 23 it is shown another possible embodiment for the connection of the product container 1 to the dosing mechanism 50: instead of using screwing, as already described, the container 1 is directly clamped to the dosing mechanism 50, using a lever mechanism 40 combined with a clamping motor 80, allowing to block the container automatically onto the dosing mechanism 50. FIGS. 20 and 21 show the dosing mechanism 50 so configured, comprising the lever mechanism 40 and the clamping motor 80 acting on it in order to tightly adjust to the container 1. In fact, the lever mechanism 40 and the clamping motor 80 configure a motorized clamping mechanism.

Figure 22:
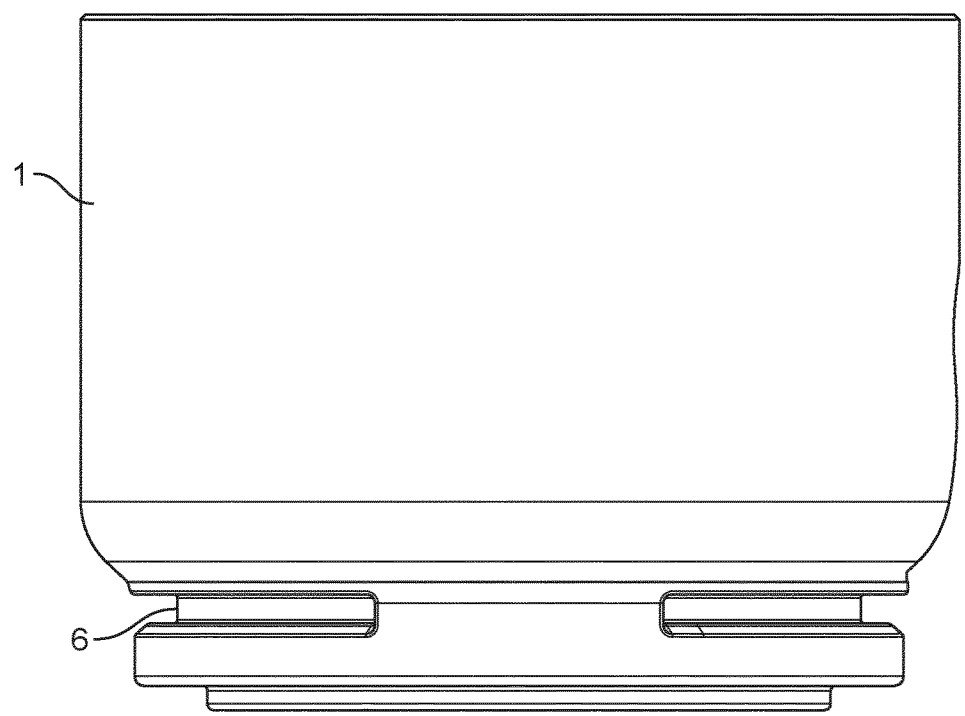
FIG. 22 shows in section view the fixation by clamps of the product container to the dosing mechanism, in a multi-serving product dispenser system for multiple dosing of a food product according to the present invention.
Figure 23:
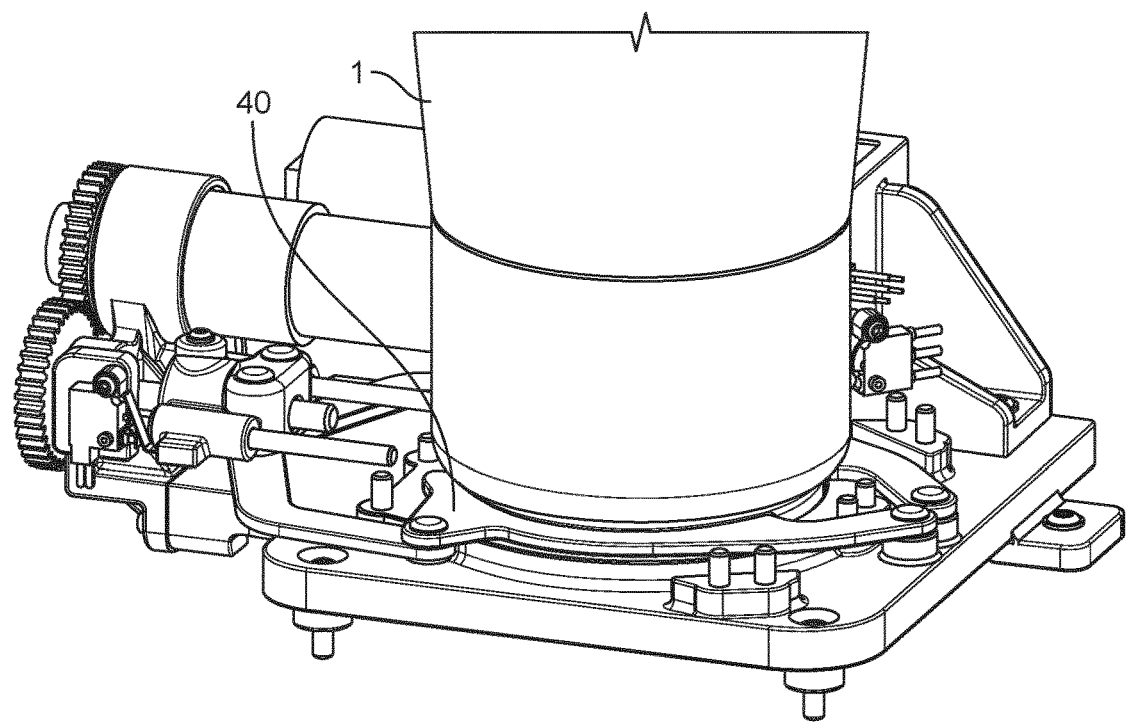
FIG. 23 shows a detail of the fixation by clamps of the product container to the dosing mechanism, in a multi-serving product dispenser system for multiple dosing of a food product according to the present invention.

As represented in FIG. 22, the product container 1 is also provided with grooves 6 for clamping, which are arranged in the lower part of the product container 1, where the lever mechanism 40 will come to grab or clamp the container. FIG. 23 shows the product container 1 in a position where it is fixed by clamping to the dosing mechanism 50.

The idea behind the present invention is to be able to change different containers connected to a same dosing mechanism 50 so a different product type can be delivered (for example, different types of coffee can be prepared) or removing the container from the mechanism once it is empty, after all the dosings have been made out of it, so it is refilled and connected once again to the said mechanism 50. In any case, the connection and removal of the product container 1 to the dosing mechanism 50 occurs a plurality of times: when using the solution of screwing the container to the mechanism it requires a bit more time than if you use the solution of clamping, which is faster and easier for the consumer.

The system of the invention can be integrated differently: it can be integrated to a coffee machine, for example, or it can remain as standalone so the product (coffee, for example) is delivered to a spoon or the like that will be used in a coffee machine, of the professional or barista type.

Furthermore, the present invention is directed to a product container 1 to be used in a multi-serving product dispenser system for multiple dosing of a food product, as described. The container 1 of the invention is pressurized with nitrogen gas and is provided with a rotatable outlet element (dispensing ball valve 7 or spherical ball valve 30, as different embodiments) allowing opening and closing of the inner volume 3 of the container 1 in a tight manner. There is an initial headspace $HS_0$ in the container 1, as provided before being used. The initial pressure of the nitrogen gas in the headspace of the container is calculated in such a way that, even after the last food product or last dose being dispensed out of the container, there is still a positive pressure difference with the outside pressure (atmospheric pressure of 1 atm), ensuring that no oxygen gets into the container volume.

Figure 25A:
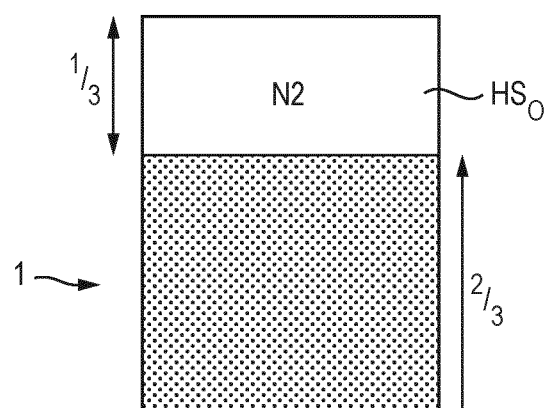
FIG. 25a shows an exemplary initial product container according to the invention, having an initial headspace volume of one third of the total container volume, where the initial nitrogen pressure is of 3.3 atm.
Figure 25B:
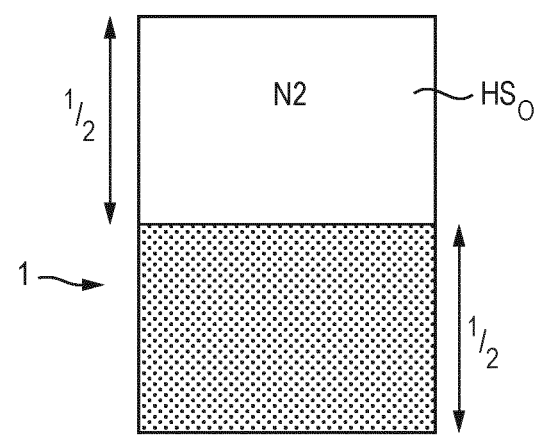
FIG. 25b shows an exemplary initial product container according to the invention, having an initial headspace volume of one half of the total container volume, where the initial nitrogen pressure is of 2 atm.

Looking now at the Table shown in FIG. 24 and at the two exemplary initial product containers in FIGS. 25a and 25b, an initial container as shown in FIG. 25a will be provided with an initial headspace $HS_0$ of around one third of the total container volume. For the calculations shown, an exemplary container of 1 litre (1000 ml) is taken, so in a container as the one shown in FIG. 25a, the $HS_0$ will be of about 300 ml. Considering a standard coffee dose delivered of 20 mg (per dose), the nitrogen gas in HS0 will be at 3.3 atm and will allow a total of 36 servings (i.e. 36 doses of coffee of 20 mg each), leaving a final pressure at the headspace of 1 atm. If the initial headspace $HS_0$ is bigger, of half the volume of the container (i.e. $HS_0$ is of 500 ml) the initial pressure will then be reduced to 2 atm, but 26 servings will be possible in that case. For a maximum number of servings and a minimum initial headspace $HS_0$ (around 1/10 of the total inner volume of the container), the initial pressure that the container will have to withstand will be of 10 bar, which will make the container too expensive for such a system. This means that, when you want to provide a container with a minimized initial headspace, you need to increase the initial pressure of the nitrogen gas in the headspace which makes that the container and the container material has to withstand the said pressure, so it is more expensive than a container with a lower such requirement. Thus, a compromise has to be reached between the headspace value and the pressure withstood by the container.

Figure 26:
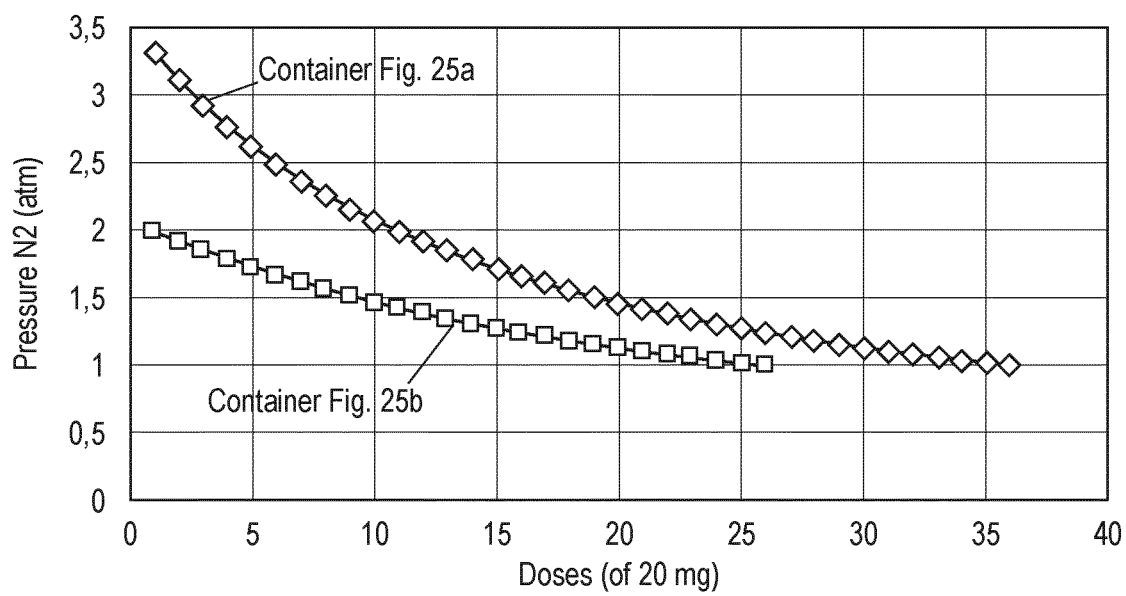
FIG. 26 shows a graph with the variation of nitrogen pressure in the headspace volume worth respect to the number of dosing being made, for the product containers according to FIGS. 25a and 25b.

FIG. 26 represents a graph with the values of pressure and number of servings, for a container as the one represented in FIG. 25a and for a container as per FIG. 25b. In the vertical Y axis, the pressure of the nitrogen gas in the headspace is represented, depending on the number of servings having been made by the container 1, which are represented in the horizontal X axis.

The invention further relates to a method for dispensing a food product one or a plurality of times using a multi-serving dispenser system as the one just described.

The method of the invention comprises the following steps:
  first, the product container 1 is connected in a tight manner to the dosing mechanism 50: the container 1 is in a first closed position defined by the rotatable outlet element 7, 30;
  after that, the product container 1 is opened by changing the position of the rotatable outlet element 7, 30;
  subsequently, a certain quantity of food product is dosed by moving the moveable element or piston 23 to create a dosing chamber 70 in the dosing mechanism 50, keeping the inner volume 3 and the volume of the dosing chamber 70 at a pressure that is higher than the atmospheric pressure;

then, the product container 1 is reclosed by changing the position of the rotatable outlet element 7, 30, while the volume of the dosing chamber 70 remains at a pressure higher than the atmospheric pressure;

finally, the moveable element or piston 23 moves so the product delivered into the dosing chamber 70 is put at atmospheric pressure and is later delivered.

In the method according to the invention, when the product into the dosing chamber 70 is put at atmospheric pressure, air enters into this dosing chamber 70 through a second air channel 28 to help delivering of the food product as it helps pushing out the product in the chamber 70 through the product delivery tube 20 (see FIG. 11, for example). At the end of the process, the moveable element or piston 23 goes back to its initial position and the air that could remain in the dosing chamber 70 is pushed out through an air evacuation tube 27, so the system is back to its initial position (as in FIG. 6 or 7) and is ready for a new dosing of food product.

Although the present invention has been described with reference to preferred embodiments thereof, many modifications and alternations may be made by a person having ordinary skill in the art without departing from the scope of this invention, which is defined by the appended claims.

The invention claimed is:

1. A product container for multiple dosing of a food product, the product container comprising:
    an inner volume with the food product, the inner volume being pressurized with nitrogen gas;
    a rotatable outlet element configured to move between:
        an open position, wherein the rotatable outlet element of the product container is open; and
        a closed position, wherein the rotatable outlet element of the product container is closed,
            the rotatable outlet element being configured to open and to close the inner volume of the product container under pressure;
    the pressure inside the product container being higher than an atmospheric pressure,
    wherein an initial pressure of the nitrogen gas in an initial headspace of the product container is calculated such that a positive pressure difference in the product container with an outside pressure after a last food product is dispensed out of the product container is maintained.

2. The product container according to claim 1 wherein the initial headspace in the product container determines the initial pressure in the inner volume.

3. The product container according to claim 1 wherein a number of doses allowed by the product container is determined by the initial headspace and the initial pressure.

4. The product container according to claim 1 wherein the initial headspace is between one-third and one-half of the inner volume of the container.

5. The product container according to claim 1 wherein the initial pressure in the product container is between 2 and 3.5 atm.

6. The product container according to claim 1 comprising an oxygen and humidity barrier material configured to prevent oxidation of the food product in the inner volume.

7. A multi-serving product dispenser system for multiple dosing of a food product, the multi-serving product dispenser system comprising:
    a product container for the multiple dosing of the food product, the product container comprising:
        an inner volume with the food product, the inner volume being pressurized with nitrogen gas; and
        a rotatable outlet element configured to move between:
            an open position, wherein the rotatable outlet element of the product container is open; and
            a closed position, wherein the rotatable outlet element of the product container is closed,
                the rotatable outlet element being configured to open and to close the inner volume of the product container under pressure; and
            a pressure inside the product container being higher than an atmospheric pressure; and
    a dosing mechanism,
    the product container configured to be connected to the dosing mechanism by the rotatable outlet element in a tight manner,
    the dosing mechanism comprising a moveable element, wherein movement of the moveable element is sequential to movement of the rotatable outlet element such that the food product can be stored and dispensed into a dosing chamber in the dosing mechanism while maintaining the pressure inside the product container higher than the atmospheric pressure,
    wherein an initial pressure of the nitrogen gas in an initial headspace of the product container is calculated such that a positive pressure difference in the product container with an outside pressure after a last food product is dispensed out of the product container is maintained.

8. The multi-serving product dispenser system according to claim 7, wherein the container is attached to the dosing mechanism either by screwing or by clamping.

9. The multi-serving product dispenser system according to claim 7, wherein the dosing mechanism further comprises an air channel which can be opened or closed allowing the evacuation of air when in the open position.

10. The multi-serving product dispenser system according to claim 7, wherein the dosing mechanism further comprises a secondary air channel to facilitate the emptying of the product from the dosing chamber.

11. The multi-serving product dispenser system according to claim 7, wherein the dosing mechanism comprises an axis connectable to the rotatable outlet element to move it from a position where the outlet of the container is open to a position where the outlet of the container is closed.

12. The multi-serving product dispenser system according to claim 7, wherein a volume in the dosing chamber defines a volumetric dose of the food product to be delivered by the multi-serving product dispenser system.

13. A multi-serving product dispenser system for multiple dosing of a food product, the multi-serving product dispenser system comprising:
    a product container for the multiple dosing of the food product, the product container comprising:
        an inner volume with the food product, the inner volume being pressurized with nitrogen gas; and
        a rotatable outlet element configured to move between:
            an open position, wherein the rotatable outlet element of the product container is open; and
            a closed position, wherein the rotatable outlet element of the product container is closed,
                the rotatable outlet element being configured to open and to close the inner volume of the product container under pressure; and
            a pressure inside the product container being higher than an atmospheric pressure; and
    a dosing mechanism,
    the product container configured to be connected to the dosing mechanism by the rotatable outlet element in a tight manner, the dosing mechanism comprising a moveable element, wherein movement of the moveable element is sequential to movement of the rotatable outlet element such that the food product can be stored and dispensed into a dosing chamber in the dosing mechanism while maintaining the pressure inside the product container higher than the atmospheric pressure, and wherein the moveable element is one of a linear piston or a pivotable piston.

14. A multi-serving product dispenser system for multiple dosing of a food product, the multi-serving product dispenser system comprising:
a product container for the multiple dosing of the food product, the product container comprising:
an inner volume with the food product, the inner volume being pressurized with nitrogen gas; and
a rotatable outlet element configured to move between:
an open position, wherein the rotatable outlet element of the product container is open; and
a closed position, wherein the rotatable outlet element of the product container is closed,
the rotatable outlet element being configured to open and to close the inner volume of the product container under pressure; and
a pressure inside the product container being higher than an atmospheric pressure; and
a dosing mechanism,
the product container configured to be connected to the dosing mechanism by the rotatable outlet element in a tight manner,
the dosing mechanism comprising a moveable element, wherein movement of the moveable element is sequential to movement of the rotatable outlet element such that the food product can be stored and dispensed into a dosing chamber in the dosing mechanism while maintaining the pressure inside the product container higher than the atmospheric pressure,
wherein the rotatable outlet element is a rotatable valve, and
wherein the product container further comprises an inner spring, a gear wheel, and a rotatable spring support, wherein rotation of the rotatable valve actuates the inner spring through the gear wheel and the rotatable spring support.

15. A multi-serving product dispenser system for multiple dosing of a food product, the multi-serving product dispenser system comprising:
a product container for the multiple dosing of the food product, the product container comprising:
an inner volume with the food product, the inner volume being pressurized with nitrogen gas; and
a rotatable outlet element configured to move between:
an open position, wherein the rotatable outlet element of the product container is open; and
a closed position, wherein the rotatable outlet element of the product container is closed,
the rotatable outlet element being configured to open and to close the inner volume of the product container under pressure, wherein the rotatable outlet element is a spherical ball valve, the spherical ball valve comprising a mixing blade configured to rotate jointly with the spherical ball valve; and
a pressure inside the product container being higher than an atmospheric pressure; and
a dosing mechanism,
the product container configured to be connected to the dosing mechanism by the rotatable outlet element in a tight manner,
the dosing mechanism comprising a moveable element, wherein movement of the moveable element is sequential to movement of the rotatable outlet element such that the food product can be stored and dispensed into a dosing chamber in the dosing mechanism while maintaining the pressure inside the product container higher than the atmospheric pressure.

16. A method for dispensing a food product one time or a plurality of times using a multi-serving dispenser system, the method comprising the steps of:
connecting a product container in a tight manner to a dosing mechanism, the product container being in a first closed position defined by a rotatable outlet element;
opening the product container by changing the first closed position of the rotatable outlet element to a second open position;
dosing a certain quantity of the food product by moving a moveable element to create a dosing chamber in the dosing mechanism while maintaining a pressure higher than an atmospheric pressure in the inner volume of the product container and a volume of the dosing chamber;
closing the product container by changing the second open position of the rotatable outlet element to the first closed position while maintaining a pressure higher than the atmospheric pressure in the volume of the dosing chamber; and
moving the moveable element so the food product delivered into the dosing chamber is provided at the atmospheric pressure,
wherein an initial pressure of the nitrogen gas in an initial headspace of the product container is calculated such that a positive pressure difference in the product container with an outside pressure after a last food product is dispensed out of the product container is maintained.

17. A method for dispensing a food product according to claim 16, wherein when the food product in the dosing chamber is dispensed at atmospheric pressure, air enters the dosing chamber through a second air channel to help deliver the food product.

18. The method according to claim 16 wherein returning the moveable element to an initial position, causing air to be pushed out of the dosing chamber through an air evacuation tube, after the food product is dispensed from the dosing chamber.

* * * * *